US012771666B2

(12) United States Patent
Gattis et al.

(10) Patent No.: US 12,771,666 B2
(45) **Date of Patent: *Oct. 20, 2026**

(54) DETERMINING POINTS OF INTEREST IN A CONTENT ITEM

(71) Applicant: Comcast Cable Communications, LLC, Philadelphia, PA (US)

(72) Inventors: Galen Trevor Gattis, Sunnyvale, CA (US); Leslie Chapman, Philadelphia, PA (US); Hong Kwon, Sunnyvale, CA (US); Jennifer Metz, Haverford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,509

(22) Filed: Dec. 15, 2023

(65) Prior Publication Data

US 2024/0114218 A1 Apr. 4, 2024

Related U.S. Application Data

(63) Continuation of application No. 18/179,095, filed on Mar. 6, 2023, now Pat. No. 11,882,344, which is a (Continued)

(51) Int. Cl.
*H04L 51/52* (2022.01)
*H04N 21/235* (2011.01)
(Continued)

(52) U.S. Cl.
CPC ......... *H04L 51/52* (2022.05); *H04N 21/2353* (2013.01); *H04N 21/2407* (2013.01);
(Continued)

(58) Field of Classification Search
CPC ........... H04N 21/8455; H04N 21/2353; H04N 21/2407; H04N 21/26258; H04N 21/4725;
(Continued)

(56) References Cited

U.S. PATENT DOCUMENTS 6,694,311 B1 2/2004 Smith
6,701,292 B1 3/2004 Kawai et al.
(Continued)

FOREIGN PATENT DOCUMENTS

WO WO-2011009101 A1 * 1/2011 ....... G06F 16/24573
WO 2011034955 A2 3/2011

OTHER PUBLICATIONS

Extended European Search Report—EP 12189192.3—Mailing date: Feb. 12, 2013.
(Continued)

*Primary Examiner* — Oanh Duong
(74) *Attorney, Agent, or Firm* — Banner & Witcoff, Ltd.

(57) ABSTRACT

Aspects discussed herein relate to systems, apparatuses, and methods to identify points of interest of viewers of a content item concurrently being transmitted in a linear stream to the viewers. A point of interest may refer to a segment of the content item that caused a surge in user reactions. During a subsequent transmission of the content item, identified points of interests may be displayed to the viewer. The viewer may select the point of interest in the content item to begin playback of the point of interest in the content item.

20 Claims, 7 Drawing Sheets

Related U.S. Application Data continuation of application No. 17/470,428, filed on Sep. 9, 2021, now Pat. No. 11,622,162, which is a continuation of application No. 15/060,438, filed on Mar. 3, 2016, now Pat. No. 11,146,865.

(51) Int. Cl.

| | |
|---|---|
| ***H04N 21/24*** | (2011.01) |
| ***H04N 21/262*** | (2011.01) |
| ***H04N 21/4725*** | (2011.01) |
| ***H04N 21/4788*** | (2011.01) |
| ***H04N 21/482*** | (2011.01) |
| ***H04N 21/845*** | (2011.01) |

(52) U.S. Cl.
CPC ... *H04N 21/26258* (2013.01); *H04N 21/4725* (2013.01); *H04N 21/4788* (2013.01); *H04N 21/4825* (2013.01); *H04N 21/8455* (2013.01); *H04N 21/8456* (2013.01)

(58) Field of Classification Search
CPC ........... H04N 21/4788; H04N 21/4825; H04N 21/8456; H04L 51/52
See application file for complete search history.

(56) References Cited

U.S. PATENT DOCUMENTS

| | | | | |
|---|---|---|---|---|
| 7,046,248 | B1 | 5/2006 | Perttunen | |
| 7,272,593 | B1 | 9/2007 | Castelli et al. | |
| 7,526,458 | B2 | 4/2009 | Flinn et al. | |
| 7,624,416 | B1 | 11/2009 | Vandermolen et al. | |
| 8,006,268 | B2 | 8/2011 | Sloo | |
| 8,538,820 | B1 * | 9/2013 | Migdal | G07G 1/0054 705/16 |
| 8,620,919 | B2 | 12/2013 | Gates et al. | |
| 8,655,885 | B1 | 2/2014 | Scott et al. | |
| 8,694,457 | B2 | 4/2014 | Flinn et al. | |
| 8,819,030 | B1 | 8/2014 | Freed et al. | |
| 8,843,430 | B2 | 9/2014 | Jojic et al. | |
| 8,984,098 | B1 | 3/2015 | Tomkins et al. | |
| 9,066,145 | B2 * | 6/2015 | Kilar | H04N 21/6582 |
| 9,253,533 | B1 | 2/2016 | Morgan et al. | |
| 9,451,307 | B2 * | 9/2016 | McClanahan | H04N 21/26258 |
| 9,473,548 | B1 | 10/2016 | Chakrovorthy et al. | |
| 9,473,730 | B1 | 10/2016 | Roy et al. | |
| 9,560,417 | B1 | 1/2017 | Pan et al. | |
| 9,692,778 | B1 | 6/2017 | Mohanty | |
| 10,360,601 | B1 | 7/2019 | Adegan | |
| 10,572,664 | B2 * | 2/2020 | Hager | G06F 21/564 |
| 11,146,865 | B2 | 10/2021 | Gattis et al. | |
| 11,157,550 | B2 | 10/2021 | Watanabe et al. | |
| 11,244,017 | B2 | 2/2022 | Sayyadi et al. | |
| 11,622,162 | B2 | 4/2023 | Gattis et al. | |
| 11,882,344 | B2 * | 1/2024 | Gattis | H04N 21/4825 |
| 2003/0218696 | A1 | 11/2003 | Bagga et al. | |
| 2005/0165782 | A1 | 7/2005 | Yamamoto | |
| 2006/0064393 | A1 | 3/2006 | Orr | |
| 2007/0028266 | A1 | 2/2007 | Trajkovic et al. | |
| 2007/0154168 | A1 | 7/2007 | Cordray et al. | |
| 2008/0215583 | A1 | 9/2008 | Gunawardena et al. | |
| 2008/0281658 | A1 | 11/2008 | Siessman | |
| 2009/0012965 | A1 | 1/2009 | Franken | |
| 2009/0083251 | A1 | 3/2009 | Sahasrabudhe et al. | |
| 2009/0100094 | A1 | 4/2009 | Verdaguer et al. | |
| 2009/0217804 | A1 | 9/2009 | Lu et al. | |
| 2009/0327336 | A1 | 12/2009 | King et al. | |
| 2010/0050202 | A1 | 2/2010 | Kandekar et al. | |
| 2010/0318575 | A1 | 12/2010 | Murphy et al. | |
| 2010/0332440 | A1 | 12/2010 | Brodsky | |
| 2010/0332568 | A1 | 12/2010 | Morrison et al. | |
| 2011/0112952 | A1 | 5/2011 | Annunziata et al. | |
| 2011/0207482 | A1 | 8/2011 | Shamma et al. | |
| 2012/0093481 | A1 * | 4/2012 | McDowell | G11B 27/322 348/143 |
| 2012/0158721 | A1 | 6/2012 | Hua et al. | |
| 2012/0158743 | A1 | 6/2012 | Gardner et al. | |
| 2012/0290518 | A1 | 11/2012 | Flinn et al. | |
| 2012/0297038 | A1 | 11/2012 | Mei et al. | |
| 2013/0103634 | A1 | 4/2013 | Jojic et al. | |
| 2013/0117147 | A1 | 5/2013 | Ackerman et al. | |
| 2013/0176438 | A1 | 7/2013 | Mate et al. | |
| 2013/0297353 | A1 | 11/2013 | Strange et al. | |
| 2013/0297706 | A1 * | 11/2013 | Arme | H04N 21/8455 709/206 |
| 2013/0339857 | A1 | 12/2013 | Garcia Bailo et al. | |
| 2014/0085328 | A1 | 3/2014 | Codella et al. | |
| 2014/0101304 | A1 | 4/2014 | Webster | |
| 2014/0108316 | A1 | 4/2014 | Goldman | |
| 2014/0164401 | A1 | 6/2014 | Kyaw et al. | |
| 2014/0372253 | A1 | 12/2014 | Arunachalam et al. | |
| 2015/0066925 | A1 | 3/2015 | Park et al. | |
| 2015/0089520 | A1 * | 3/2015 | Lee | H04N 21/44204 725/14 |
| 2015/0095937 | A1 * | 4/2015 | Tobin | H04N 21/4756 725/32 |
| 2015/0143392 | A1 | 5/2015 | Silveira-Filho et al. | |
| 2015/0273336 | A1 | 10/2015 | Schmitt et al. | |
| 2015/0347411 | A1 | 12/2015 | Friggeri et al. | |
| 2015/0370797 | A1 | 12/2015 | Mishra et al. | |
| 2016/0004699 | A1 | 1/2016 | Liu et al. | |
| 2016/0034512 | A1 | 2/2016 | Singhal et al. | |
| 2016/0055532 | A1 | 2/2016 | Connolly et al. | |
| 2016/0070764 | A1 | 3/2016 | Helvik et al. | |
| 2016/0073168 | A1 * | 3/2016 | Gardes | H04N 21/23424 725/32 |
| 2016/0094501 | A1 | 3/2016 | Lee et al. | |
| 2016/0105708 | A1 * | 4/2016 | Packard | H04N 21/8456 725/10 |
| 2016/0110358 | A1 | 4/2016 | Lee | |
| 2016/0154887 | A1 | 6/2016 | Zhao | |
| 2016/0182921 | A1 * | 6/2016 | Martin | H04N 21/44226 725/18 |
| 2016/0247192 | A1 | 8/2016 | Evans et al. | |
| 2016/0285941 | A1 * | 9/2016 | Xie | H04N 21/64792 |
| 2016/0308944 | A1 | 10/2016 | Zhang et al. | |
| 2016/0323625 | A1 | 11/2016 | Casagrande | |
| 2016/0330526 | A1 | 11/2016 | Marchetti et al. | |
| 2016/0379222 | A1 | 12/2016 | Chauhan et al. | |
| 2017/0006252 | A1 * | 1/2017 | Patel | H04N 5/783 |
| 2017/0032384 | A1 | 2/2017 | Harris et al. | |
| 2017/0085941 | A1 | 3/2017 | Gupta et al. | |
| 2017/0134803 | A1 | 5/2017 | Shaw et al. | |
| 2017/0180414 | A1 | 6/2017 | Andrews et al. | |
| 2017/0257651 | A1 * | 9/2017 | Zhu | H04N 21/24 |
| 2017/0262815 | A1 | 9/2017 | Shipman et al. | |
| 2017/0287044 | A1 | 10/2017 | Rose et al. | |

OTHER PUBLICATIONS

Ahn, "A new similarity measure for collaborative filtering to alleviate the new user cold-starting problem," Information Sciences, 2008. 178(1): pp. 37-51.
Anand and Bharadwaj, "Utilizing various sparsity measures for enhancing accuracy of collaborative recommender systems based on local and global similarities," Expert Systems with Applications, 2011. 38(5), pp. 5101-5109.
Apache Foundation. Available from: http://mahout.apache.org/, pp. 1-3. Retrieved Oct. 19, 2011.
Bambini et al., "A Recommender System for an IPTV Service Provider: a Real Large-Scale Production Environment," Recommender Systems Handbook, 2011: p. 299-331. (I see pp. 1-16.).
Cantador et al., "Content-based recommendation in social tagging systems," Recommender Systems. 2010, Sep. 26-30, 2010, pp. 1-4.
Fu and Leng, "A Framework for Recommender Systems in E-Commerce Based on Distributed Storage and Data-Mining," 2010 International Conference on E-Business and E-Government, 2010, pp. 3502-3505.
Adomavicius and Tuzhilin, "Toward the Next Generation of Recommender Systems: A Survey of the State-of-the-Art and Possible Extensions," IEEE Transactions on Knowledge and Data Engineering, Jun. 2005. 17(6): p. 734-749.

(56) References Cited

OTHER PUBLICATIONS

Gong, "An Efficient Collaborative Recommendation Algorithm Based on Item Clustering," Advances in Wireless Networks and Information Systems, 2010. 72, pp. 381-387.
GroupLens Research. Available from: http://www.grouplens.org/node/12, pp. 1-3. Retrieved Oct. 19, 2011.
Gunawardana and Shani, "A Survey of Accuracy Evaluation Metrics of Recommendation Tasks," The Journal of Machine Learning Research, 2009. 10, pp. 2935-2962.
Herlocker et al., "Evaluating collaborative filtering recommender systems," ACM Transactions on Information Systems (TOIS), Jan. 2004. 22(1), pp. 5-53.
Jiang and Wang, "Pagerank-Based Collaborative Filtering Recommendation," Information Computing and Applications, 2010. 6377, pp. 597-604.
Karypis, "Evaluation of Item-Based Top-N Recommendation Algorithms," Proceedings of the tenth international conference on Information and knowledge management. 2001, pp. 1-8.
Koren, "Factorization meets the neighborhood: a multifaceted collaborative filtering model," Proceeding of the 14th ACM SIGKDD international conference on Knowledge discovery and data mining. 2008, pp. 1-9.
Lekakos and Caravelas, "A hybrid approach for movie recommendation," Multimedia Tools and Applications, 2008. 36(1-2): p. 55-70.
Liang et al. "Collaborative Filtering Recommender Systems Using Tag Information," International Conference on Web Intelligence and Intelligent Agent Technology. 2008, pp. 59-62.
Melville and Sindhwani, "Recommender Systems," Encyclopedia of Machine Learning, 2010, Chapter No. 00338, pp. 1-9.
Miller et al., "MovieLens unplugged: experiences with an occasionally connected recommender system," Proceedings of the 8th international conference on Intelligent user interfaces. Jan. 12-15, 2003, pp. 263-266.
Musto, "Enhanced vector space models for content-based recommender systems," Recommender Systems. Sep. 26-30, 2010, pp. 361-364.
Ormándi et al., "Overlay Management for Fully Distributed User-Based Collaborative Filtering," Lecture Notes in Computer Science, 2010. 6271-6282.
Resnick and Varian, "Recommender systems," Communications of the ACM, 1997. 40(3), pp. 56-58.
Sarwar et al. "Item-based collaborative filtering recommendation algorithms," Proceedings of WWWW '01 Proceedings of the 10th international conference on World Wide Web. May 1-5, 2001, pp. 285-295.
Schlieder, "Modeling Collaborative Semantics with a Geographic Recommender," Advances in Conceptual Modeling—Foundations and Applications, Nov. 6-9, 2007. 4802-4812.
Su and Khoshgoftaar, "A survey of collaborative filtering techniques," Advances in Artificial Intelligence, 2009.
Töscher et al., "Improved neighborhood-based algorithms for large-scale recommender systems," Proceedings of the 2nd KDD Workshop on Large-Scale Recommender Systems and the Netflix Prize Competition. Aug. 24, 2008, pp. 1-6.
Wang et al., "Probabilistic relevance ranking for collaborative filtering," Information Retrieval, 2008. 11(6), pp. 1-27.
Zhao and Shang, "User-based collaborative-filtering recommendation algorithms on hadoop," Third International Conference on Knowledge Discovery and Data Mining. 2010, pp. 478-481.
Jojic et. al., "A Probabilistic Definition of Item Similarity," RecSys '11 Proceedings of the Fifth ACM Conference on Recommender Systems, Oct. 23-27, 2011, pp. 229-236, ACM New York, NY, USA.
Deshpande, M. et al. Item-based top-N recommendation algorithms, ACM Transactions on Information Systems, vol. 22, No. 1 (Jan. 2004), pp. 143-177.
Papagelis et al. "Qualitative analysis of user-based and item-based prediction algorithms for recommendation agents". Engineering Applications of Artificial Intelligence vol. 18 No. 7 (2005) pp. 781-789.
"Getting Started—DeepLearning 0.1 documentation", Deeplearning.net, retrieved on Jan. 23, 2015 from <http://deeplearning.net/tutorial/gettingstarted.html#opt-sgd>.
"Symmetric Matrix", Wikipedia, retrieved on Feb. 13, 2015 from <http://en.wikipedia.org/wiki/Symmetric_matrix>.
Ashutosh Saxena et al., "Non-linear Dimensionally Reduction by Locally Linear Isomaps", Indian Institute of Technology Kanpur, 2004.
Carl D. Meyer, "Martix Analysis and Applied Linear Algebra", SIAM, Apr. 19, 2000.
Francesco Ricci, "Part 13: Item-to-Item Collaborative Filtering and Matrix Factorization", retrieved Feb. 13, 2015.
Kirk Baker, "Singular Value Decomposition Tutorial", Mar. 29, 2005.
Io (post author), "Differences between the L1-norm and the L2-norm (Least Absolute Deviations and Least Squares)", Garbled Notes: Things I Left Hanging Around, Dec. 3, 2013. Retrieved on Mar. 12, 2015 from <http://www.chioka.in/differences-between-the-l1-norm-and-the-l2-norm-least-absolute-deviations-and-least-squares/>.
Ryan Tibshirani, "Modern regression 1: Ridge regression", Mar. 19, 2013.
Vered Kunik, "Item Based Collaborative filtering Recommendation Algorithms".
Yifan Hu et al., "Collaborative Filtering for Implicit Feedback Datasets", Data Mining, 2008.
European Office Action—EP Appl. 12189192.3—dated Mar. 3, 2016.
Jan. 16, 2018—European Office Action—EP 12189192.3.
Feb. 28, 2018—Extended European Search Report—17202818.5.
Aug. 9, 2018—Canadian Office Action—CA 2,792,558.
May 20, 2019—European Summons to Oral Proceedings—12189192.3.
Aug. 2, 2019—European Office Action—EP 17202818.5.
Jul. 15, 2020—European Decision to Refuse—EP 17202818.5.

* cited by examiner

DETERMINING POINTS OF INTEREST IN A CONTENT ITEM

CROSS-REFERENCE TO RELATED APPLICATIONS

This application is a continuation of and claims priority to U.S. patent application Ser. No. 18/179,095, filed Mar. 6, 2023, which is a continuation of U.S. patent application Ser. No. 17/470,428, filed on Sep. 9, 2021 and now U.S. Pat. No. 11,622,162, which is a continuation of U.S. patent application Ser. No. 15/060,438, filed on Mar. 3, 2016 and now U.S. Pat. No. 11,146,865, each of which is hereby incorporated by reference in its entirety.

BACKGROUND

During video playback of a content item such as a movie or a television show, viewers may only select entry points defined by either a manufacturer or a provider of the content item. An entry point may be a point in playback of the content item in which the viewer may enter as a result of selecting the entry point. In some instances, the entry points correspond to different chapters or scenes of the content item. In additional or alternative instances, the chapter entry points may occur at a specified time interval (e.g., every 10 seconds, every 30 second, etc.). However, in each of these cases, the entry points are set up by the manufacturer or provider of the content item without input from the viewers of the content item.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects discussed herein relate to systems, apparatuses, and methods to identify, in near real-time, points of interest of viewers of a content item during transmission of the content item to the viewers in a linear stream. A point of interest may also be referred to herein as a hotspot and may refer to a segment (e.g., a portion) of the content item that caused the point of interest. A point of interest may be identified in response to determining a surge in user interest in the segment of the content item. The user interest may be in the form of social media messages relating to the content item posted by viewers to social networking service providers during transmission of the linear stream to the viewers. Once a point of interest is identified, at least a start time of the segment relative to playback of the content item may be identified and associated with the point of interest. The start time may serve as a bookmark to begin playback of the segment at some later point in time. During subsequent playback of the content item, a playback timeline (e.g., linear progress bar) may be displayed to the viewer with icons representing the bookmarks. The user may select the icon associated with a point of interest to begin playback of the segment associated with the point of interest. As a result, the user may jump to various points of interest in the content item for view, which may be reflective of the most interesting parts of the content item (e.g., a fight scene in a reality television show). During playback of a segment corresponding to a point of interest, one or more social media messages related to the segment may be displayed to the viewer thereby enhancing the viewer experience. In some instances, these social media messages may be displayed overlaid on one or more frames of the segment.

Various features described herein may provide a playlist of points of interest (e.g., a highlight reel for a television series). In some instances, the points of interest in one or more content items may be identified. In such instances, a start time and an end time of the segment corresponding with a point of interest may also be identified and bookmarked so that the start time and end time of the segment are known and may be used in generating the playlist of points of interest. Each segment associated with a point of interest may be characterized via one or more attributes describing a scene in the segment (e.g., a dance scene) or other characteristic (e.g., quoted dialogue, a topic identifier, etc.). A user may request a playlist of points of interest and the request may include one or more attributes and, optionally, the identifier of a content item, a set of content items (e.g., a television series), etc. As an example, the request may be for points of interest associated with dance scenes in a particular television series. In response, dance scenes that were identified as a point of interest in the television series may be viewed in a playlist.

Various features described herein may provide users with an auto-generated table of contents of points of interest. Each point of interest may be associated with a unique identifier, corresponding segment information (e.g., start time, end time), corresponding attribute information, etc. This information may be stored in a database, which may then be searched to dynamically and automatically generate a table of points of interest for view by a particular viewer. A request from the particular viewer may be used to identify search terms.

These features in the summary above are merely illustrative of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
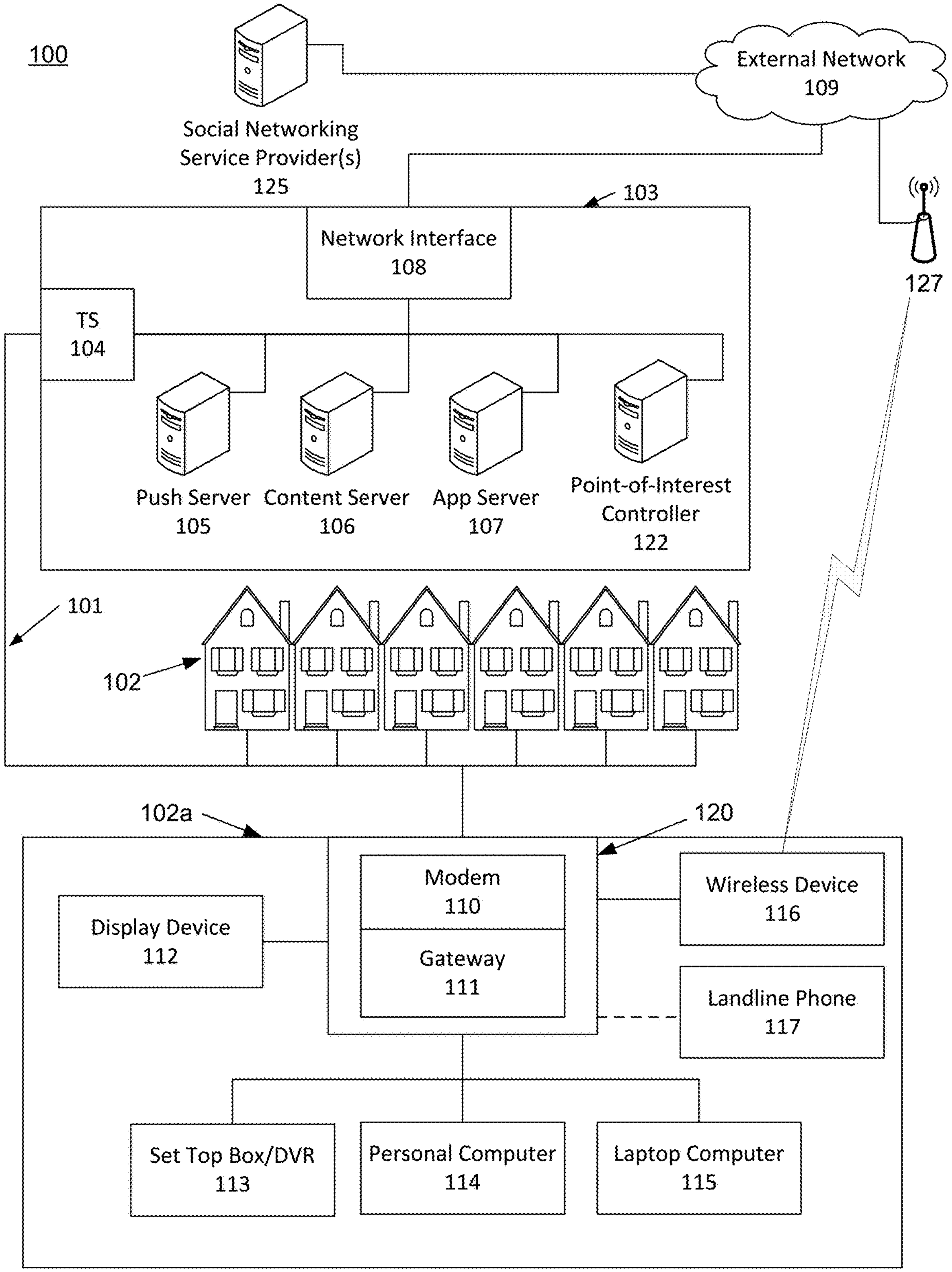
FIG. 1 depicts an illustrative information access and distribution network in accordance with one or more aspects as described herein.

FIG. 1 illustrates an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, train stations, airports, etc.) to a local office 103 (e.g., a headend). The local office 103 may transmit downstream information signals onto the communication links 101, and each of the premises 102 may have a receiver used to receive and process those signals.

One of the communication links 101 may originate from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly. Portions of the communication links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of the communication links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. The external networks 109 may include a combination of wired and/or wireless communication links. For instance, the external network 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network. As an example, the external network 109 may include a base station 127, which may be a cellular or satellite access point that may wirelessly communicate with a wireless device 116 such as smartphone or other cellular enabled-wireless device (e.g., tablets, laptops, etc.).

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, web pages, articles, news, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in determining hotspots. Yet another application server may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102*a*, such as a home, may include an interface 120. The interface 120 can include any communication circuitry needed to allow a device to communicate on one or more of the links 101 with other devices in the network. For example, the interface 120 may include a modem 110, which may include transmitters and receivers used to communicate on the communication links 101 and with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.) landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The communication network 100 may include one or more social networking service providers 125 that may communicate with the local office 103, various web servers (not shown), laptop computer 115, and wireless device 116 (e.g., a smartphone). The social networking service providers 125 may provide communication services (e.g., social networking services) to their users (e.g., members).

Users (e.g., members) of a communication network (e.g., an online social network) may communicate with one another using the communication network. In some instances, the users may post messages on a message board for view by other users. In some instances, there may be many multiple message boards (e.g., webpage walls) with each one being specific to a different topic. In some instances, the messages may be submitted by viewers currently watching a content item being provided by the local office 103 in a linear multicast stream. In such instances, the messages may relate to aspects, ideas, moments, or actions that occurred in the content item (e.g., a fight in a reality television show).

A topic of one or more messages may be identified and/or otherwise determined by the social networking service providers 125 by determining the topic of the message board, inspecting the text of the message, and/or identifying a topic identifier in the message. As an example, a message board may be a wall or a social webpage that is associated with a particular topic. As another example, the text of the message may be parsed and analyzed to determine a likely topic of the message. In some instances, the social networking service provider 125 may use topic identification algorithms to identify the topic. In additional or alternative instances, the social networking service provider 125 may store a list of topics and word phrases determined to be indicative of one of the topics. Using the parsed message, the social networking service provider 125 may identify the sequence or co-occurrence of words in the message to identify the topic. As yet another example, the message itself may include an indication of the topic. For instances, a particular symbol, object, or label may indicate that a particular field of the message (e.g., the field following the symbol) is the topic of the message. In one example, the symbol may be a hashtag, which may indicate that the one or more words following the hashtag are the topic of the message. The topics may be predefined by another user of the social networking service provider, the local office 103, and/or the social networking service providers 125. A user may create a new topic by entering the symbol and new combination of characters to define the topic. In many cases as will be illustrated below, message created by viewers while they view a content item may relate to the content item. That is, the presently viewed content item may be the topic of the message. In one or more arrangements, the message may include video and/or pictures in addition (or in alternative to) text.

The social networking service providers 125 may permit many different types of ways to post social media messages to users in general or to a particular group of users of a social networking service provider. As an example, the message may be in the form of a reply or comment on a posting by another user. As another example, the message may be in the form of a favorite indication or a "like" indication indicating the person likes a particular message. In some instances, the author of the favorite or liked message may be notified that another user has "liked" the author's message (e.g., via a like or favorite count). The notification may include a social media identifier of the user who "liked" the message. As yet another example, the message may share a previously posted message with users e.g., by re-posting the previously posted message. Each of the above message types may generally be referred to as a message and may be considered a posting to a social media wall for view by the author's friends, followers, and/or the any user of the social networking service provider 125.

Further, the social networking service providers 125 may perform other social network functions including managing user account information, friend lists, messaging services, picture services, friend discovery services, etc. The social networking service providers 125 may provide message search functionality. For instance, a user may submit a search for a topic and, in response, receive each message associated with that topic. In one example, the search may be initiated by clicking on the topic or a symbol (e.g., a hashtag) indicative of the topic.

Users may interact and/or otherwise communicate with the social networking service providers 125 via one or more user-exposed interfaces on various computing devices. As an example, a user may interact with the social networking service providers 125 using a remote control device to manipulate a user interface displayed on the display devices 112 and provided by the set top box 113. As another example, a user may interact with social networking service providers 125 using a web-based interface via the personal computer 114, laptop computer 115, the wireless device 116, etc. As yet another example, a user may interact with the social networking service providers 125 using a software application (e.g., a mobile app) associated with the social networking service providers 125, which has been downloaded and installed on one or more of the personal computer 114, laptop computer 115, the wireless device 116, etc. In some instances, the messages may be relayed to the social networking service providers 125 by the local office 103. In other instances, the messages may be sent to the social networking service providers 125 via base station 127 and external network 109 without being sent through the local office 103.

The local office 103 may include a point-of-interest controller 122 (e.g., a hotspot controller, an interest server, etc.). Although shown separately, the point-of-interest controller 122 may be a server combined with one or more of the push server 105, the content server 106, and the application server 107. The point-of-interest controller 122 may be a computing device responsible for coordinating the social networking service provider's monitoring of social media messages, retrieving the monitored data, and using the monitored data to identify hotspots in content items being provided in a linear multicast stream. For instance, the point-of-interest controller 122 may transmit, to the one or more social networking service providers 125, one or more instructions for monitoring messages relating to content items provided by the local office 103 to viewers in a linear multicast stream. In some instances, the instructions may include a program ID of the content item, a topic ID specific to the social networking service provider (e.g., a hashtag followed by a particular topic), and/or other information discussed herein.

The social networking service provider 125 may then monitor and/or otherwise track messages in accordance with the instructions. As viewers view a content item provided in a linear multicast stream, they may express their thoughts and ideas relating to the content item in messages. The point-of-interest controller 122 may track when each message relating to the content item (e.g., the topic) is posted and how many messages relating to the content item are posted over a particular time period.

The social networking service provider 125 may be instructed by the point-of-interest controller 122 to periodically (e.g., every 30 seconds, every 2 minutes, etc.) or continuously provide a report to the point-of-interest controller 122. The report may include monitored data for one or more topics specified in the instructions provided to the social networking service providers 125 from the point-of-interest controller 122. The report may include an indication of how many messages relating to a specified topic have been posted and/or otherwise submitted by users over a most recent time period (e.g., over the last 30 seconds, 2 minutes, etc.). In some instances, the report may include multiple indications of how many messages relating to a specified topic have been posted and/or otherwise submitted by users over a multiple overlapping recent time periods. As an example, for a specified topic, the report may indicate that 300 messages relating to the specified topic have been received over the last 30 seconds, 400 messages relating to the specified topic have been received in the last minute, 550 messages relating to the specified topics have been received in the last minute and 30 seconds, etc.

For instance, the point-of-interest controller 122 may use the report to identify hotspots based on spikes in social media traffic relating to the content item and may create an entry point to the hotspot in the content item. Using these entry points defined by social media, viewers can jump to hotspots in the content item that caused spikes in social media traffic, which may be reflective of the most interesting parts of the content item (e.g., a fight scene in a reality television show). Further, during playback of the hotspot, the point-of-interest controller 122 may cause one or more messages related to the segment and submitted by the users to be displayed to the viewer thereby enhancing the viewer experience. In some instances, these messages may be displayed overlaid on one or more frames of the content item segment. Additionally, the point-of-interest controller 122 may generate a highlight reel of linear or non-linear content using hotspots relating to the same topic (e.g., dance scenes in a television show, television series, etc.).

In one or more arrangements, the point-of-interest controller 122 may provide users with an auto-generated table of contents of points of interest. As discussed above, the point-of-interest controller 122 may identify hotspots in a content item based on social media activity. Each of these hotspots may reflect a different point of interest in one or more content items by the viewing audience. The point-of-interest controller 122 may associate each hotspot with one or more attributes (e.g., program ID, genre ID, television series, etc.). One attribute may include a type of action performed in the hotspot (e.g., a fight scene, a dance scene, etc.). Another attribute may include key phrases from actors in that scene. Yet another attribute may be a specific social media identifier associated with the hotspot (e.g., a hashtag). Still yet another attribute may include key phrases commonly found in the messages relating to the hotspot. Hotspot identifiers and corresponding attribute information may be stored in a database, which may then be searched to dynamically and automatically generate a table of hotspots (e.g., points of interest) for a particular viewer upon request. The request may include one or more attributes desired by the viewer.

While the content item in many instances may be a video program (e.g., a movie, television show, sports event, etc.), in other instances the content item may be game, image, audio file, text file, news story, or other media.

In some embodiments, users may enter their reactions to the content item via a remote control device (e.g., a remote control provided by the content provider for use with a STB or DVR, a television remote). The television, STB, DVR, and/or other device receiving signals from the remote control device may transmit the user's reactions (e.g., selection) upstream to the point-of-interest controller 122 via communication links 101. Alternatively, the remote control device may transmit the user's reactions to the point-of-interest controller 122 over another network such as a cellular communication network or other wide area network. The remote control device may include one or more dedicated or programmable buttons to indicate a positive reaction (e.g., a thumbs up), negative reaction (e.g., thumbs down), a rating between e.g., and 10, or another reaction. Additionally or alternatively, the content provider may cause a user interface to be displayed simultaneously with the content item and may include one or more user-selectable options representative of the user's reaction, and may be considered a message as used herein. In some instances, the user interface may be overlaid on the content item. In other instances, the display area of the content item may be reduced and shifted to make room for the user interface (e.g., a side bar). The user-selectable options may include numerous emoji icons (e.g., a happy face, a sad face, a crying face, an angry face, a startled face, etc.), like, dislike, rating, laughter (e.g., laugh out loud (LOL)) or any other option that could represent the user's reaction to the content item. A user-selectable option may permit the user to enter textual messages by displaying the alphabet, number pad and symbols (e.g., punctuation symbols). Additionally, remote control devices with microphone functionality may record the users' reactions. For instance, the user may select a record button to record the user's audible (e.g., verbal) reaction such as laughter, verbal messages, and the like. The point-of-interest controller 122 may identify the user's verbal messages using a natural language determination algorithm. Additionally, a camera may be used to record facial expressions of the user such as smiling or frowning. The point-of-interest controller 122 may identify the user's facial expression using one or more facial expression algorithms. Each of the user's selection may be associated with a timestamp of when the selection was received either by the STB/DVR 113.

Further, users may enter their reactions to the content items via a mobile device (e.g., a smartphone, a tablet, computer or the like). For instance, an application or a website in a web browser displayed on the mobile device may act as a second screen for the content provider by displaying a graphical user interface in which the user can enter his or her reaction to the content item, which may be considered a message as used herein. The user interface may include the user-selectable options discussed above in connection with the remote control device. As an example, the user interface may include a like content option, a dislike content option, emoji icons, etc. As another example, the user may enter textual messages using a virtual keyboard displayed on the mobile device's touch screen or a physical keyboard. As yet another example, the user may enter an audible input via the mobile device's microphone. As yet another example, the user may convey emotions by taking a photo or video of themselves via the mobile device's camera. The user's input may be associated with a timestamp by the point-of-interest controller 122.

The point-of-interest controller 122 may analyze the number of messages received and the number of messages received directly by the point-of-interest controller 122 via the remote control or other mobile device over multiple sequential time periods to identify one or more dramatic increases (e.g., a surge or spike) in messages relating to the content item. As will be described in greater detail below, these spikes may be used to determine points of interest (e.g., hotspots) in the content item.

Figure 2:
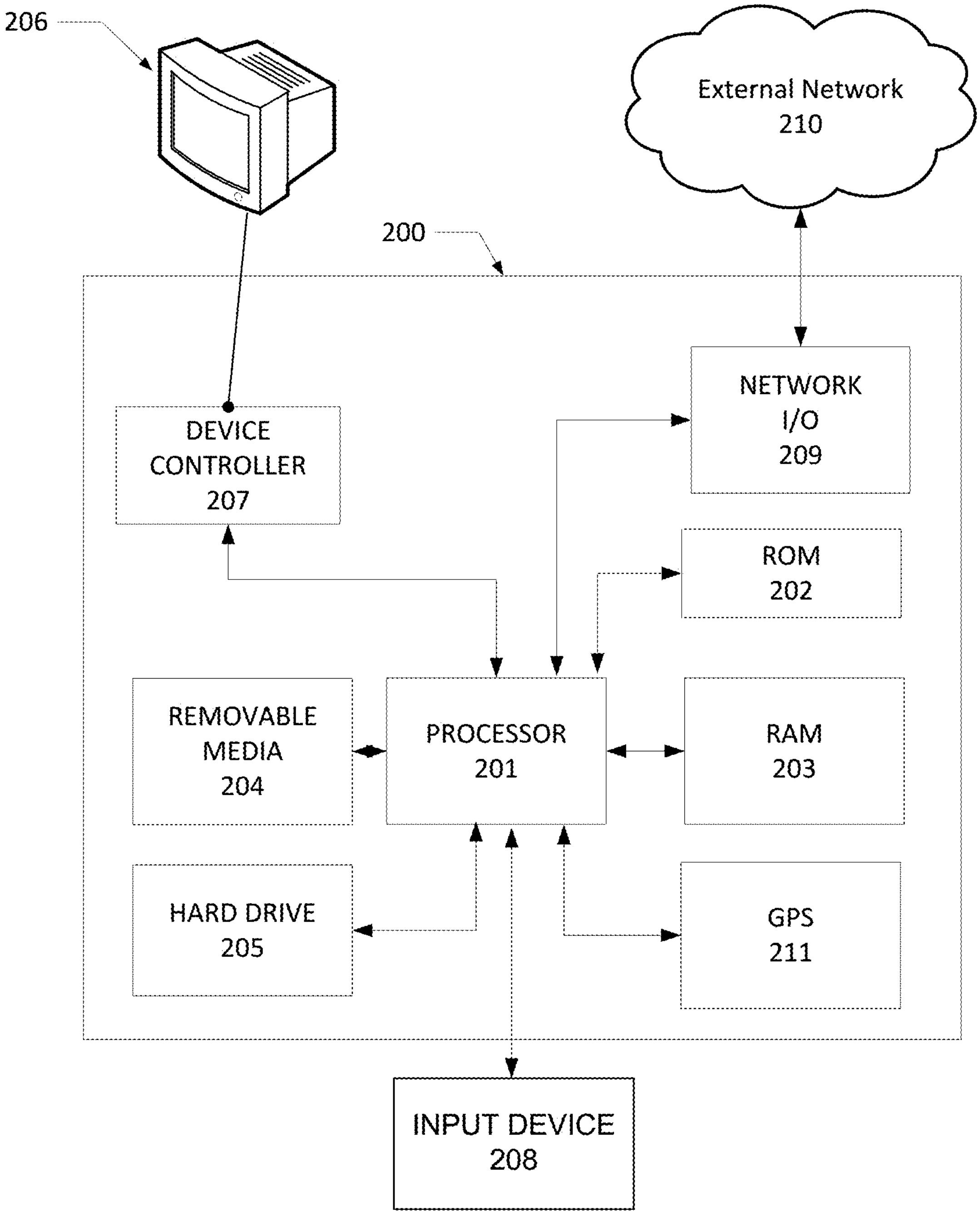
FIG. 2 depicts an illustrative computing device that may be used to implement any of the features and devices described herein.

FIG. 2 illustrates general hardware elements that can be used to implement any of the various computing devices discussed herein. The computing device 200 (e.g., the point-of-interest controller 122, etc.) may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
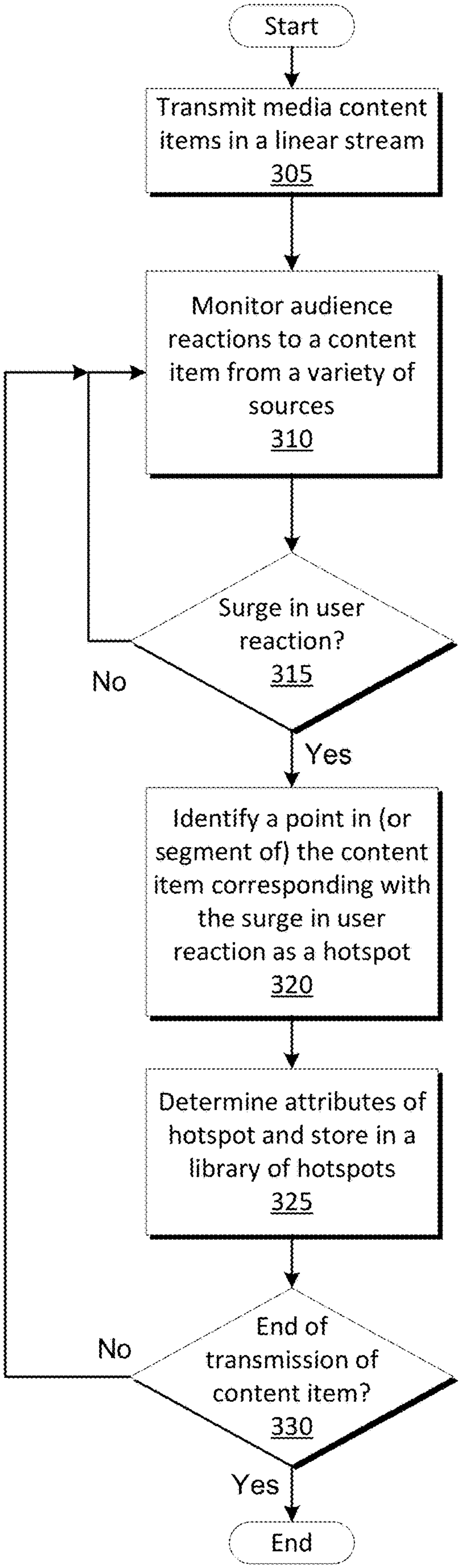
FIG. 3 depicts an example flow chart for identifying hotspots, in accordance with one or more aspects as described herein.

FIG. 3 depicts an example flow chart for identifying hotspots in accordance with one or more aspects as described herein. The method of FIG. 3 and/or one or more steps thereof may be performed by a computing device (e.g., the point-of-interest controller 122). The method illustrated in FIG. 3 and/or one or more steps thereof may be partially or fully embodied, for example, in computer-executable instructions that are stored in a computer-readable medium, such as a non-transitory computer-readable memory. In some instances, one or more of the steps of FIG. 3 may be performed in a different order and/or combined. In some instances, one or more of the steps of FIG. 3 may be omitted and/or otherwise not performed.

The method of FIG. 3 may be performed to identify segments of content items in which the audience viewing the contents items has identified as a point of interest. For instance, as a content item is transmitted in a linear multicast stream, the point-of-interest controller 122 may identify audience reactions from a variety of sources (e.g., social media sources, remote device sources, user device sources, or any other source of user reactions) to determine hotspots or points of interest in a particular segment of the transmitted content item. As an example, a live television program of a music competition may be transmitted in the linear multicast stream. As the viewers watch the program, they may enter their reactions by submitting messages to one or more of the social networking service providers 125. Additionally, viewers may also enter their reactions directly through a remote control interfacing with their set-top box (e.g., by selecting a button indicating that the user liked the content or a different button indicating that the user disliked the content). Further, users may enter their reaction into a personal device (e.g., a smartphone, tablet, computer, etc.) via an application or web-based interface configured to transmit the messages to the social networking service provider 125, which may in turn provide a report of the received messages to the point-of-interest controller 122. The point-of-interest controller 122 may determine when a surge or spike in interest in the content item occurs and bookmark a particular segment of the content item as a hotspot. During a subsequent view of the content item, the point-of-interest controller 122 may cause display of one or more user-selectable bookmarks (e.g., hotspots), which may be in the form of a table of contents of hotspots. The viewer may select a bookmark to jump to a hotspot in the content item for view. In some instances, while viewing a hotspot in the content item, one or more messages (e.g., user reactions) associated with the hotspot may be displayed overlaid on the content item, as will described in further detail below.

As seen in FIG. 3, at step 305, a computing device (e.g., the point-of-interest controller 122) may transmit content items in a linear stream to one or more user devices (e.g., STBs, tablets, phones, etc.). A content item may be a video and/or audio program (e.g., movie, television show, sports game, live electronic game play, etc.). The linear stream may be in the form of a unicast stream (e.g., a video on-demand (VOD) stream) or a multicast (e.g., broadcast) stream. The content items may be live events (e.g., sports games, award shows, etc.) or prerecorded programs (e.g., a new episode in an ongoing television program series). In some instances, the content item may be the first time the content item is being provided to a general audience (e.g., the public, subscribers of the content provider, subscriber of the content provider who has a particular status or package). In other instances, the content item may have been previously available for view by the general audience (e.g., a rerun of a television program). In some cases, multiple different content items may be transmitted in the linear stream. In some cases, the point-of-interest controller 122 may transmit multiple different content items over multiple linear streams. In some instance, multiple content items may be associated with one another (e.g., a television series).

In step 310, the point-of-interest controller 122 may, during transmission of a content item in a linear stream, monitor audience reactions to the transmitted content item from a variety of sources (e.g., social media, TV or STB remote controls, smartphones, tablets, etc.). For example, users viewing the content item may wish to comment and/or otherwise rate a particular scene of the content item. The user may submit messages to a social networking service provider 125, enter a message into a TV or STB remote control, and/or enter a message into a second screen interface provided via an application installed on a mobile device such as a smartphone, tablet, or computer.

The point-of-interest controller 122 may periodically poll (e.g., send a request to) the social networking service providers 125 for a report corresponding to the content item. In some embodiments, the request may identify the content item being transmitted using a content item identifier, which the point-of-interest controller 122 may identify based on a broadcast schedule or a VOD program identifier. The request may optionally include one or more social-network-specific identifiers to identify the content item in the social media messages. As an example, the request may include a program ID for a particular television show and a list of one or more hashtag topics relating to the content item. Further, in some instances, the request may also include parsed, closed-captioning text of the content item. In response to receiving the request, the social networking service provider 125 may provide a report of the received social media messages to the point-of-interest controller 122. In some cases, the social networking service providers 125 might not have the ability to filter out data based on metadata information about the content being watched. In such cases, the point-of-interest controller 122 may request all activity from the social networking service providers 125. The point-of-interest controller 122 may then process and filter the data in order to find related postings.

While a “pull” relationship is described above, in one or more other arrangements, a “push” relationship may be utilized. In such an arrangement, the point-of-interest controller 122 may transmit, to the social networking service providers 125, a list of content item identifiers, associated social-network-specific identifiers, associated time-intervals for capturing messages to monitor messages and transmit a report, closed-captioning data, and/or a transmission schedule (e.g., a broadcast schedule) to the social networking service providers 125 so that the social networking service providers 125 may periodically transmit (e.g., push) the reports to the point-of-interest controller 122 without it having to poll the social networking service providers 125.

The social networking service providers 125 may, using the request and/or one or more instructions sent to the social networking service providers 125 from the point-of-interest controller 122 (discussed above), identify messages related to a content item being transmitted in a linear multicast stream. In one or more arrangements, the instructions may specify to monitor for such messages only during transmission of the content item to viewers. As an example, the social networking service provider 125 may begin monitoring for messages relating to a content item once the content item has begun being transmitted to viewers. Further, the social networking service providers 125 may end monitoring for messages relating to the content item once transmission and/or playback of the content item has concluded. In one or more additional or alternative arrangements, the instructions may specify to monitor such social media message for a time period after transmission and/or playback of the content item has concluded to capture messages relating to the ending scenes of the content item.

The social networking service provider 125 may determine whether a posted message relates to the content item, which may reflect user interest and reactions to one or more scenes in the content item. Each of the examples provided below, may be performed by the social networking service provider 125 by executing instructions received from the point-of-interest controller 122. In some examples, the social networking service provider 125 may determine whether a message is associated with a social-network-specific identifier listed in the request or the instructions sent from the point-of-interest controller 122. For instance, the social networking service provider 125 may determine whether the message itself includes an identifier or symbol of its topic (e.g., a hashtag) and may compare this topic with a list of topics that have been determined to relate to the content item. If a match is found, the social networking service provider 125 may determine that the message relates to the content item and may record a unique identifier of the message, the content of the message, and a timestamp of when the message was received. A timestamp may include a field for each of year, month, day, hour, minute, second, sub-second (e.g., tenths of seconds, hundredths of seconds, etc.), an indication of morning or afternoon, and/or time zone. As an example, a timestamp may be May 19, 2015 at 10:30 pm Eastern Standard Time (EST). In some examples, the social networking service provider 125 may determine if the social media message was posted to a message board and, if so, may determine the topic of the message board and compare it with the list of topics relating to the content item. If a match is found, the social networking service provider 125 may determine that the social media message relates to the content item and record the message's unique ID, content, and timestamp. In some examples, the social networking service provider 125 may parse the messages and determine whether any words or combinations of words (e.g., a co-occurrence of words, a particular order of words, noun-phrases, etc.) match any words or combination of words (e.g., a co-occurrence of words, a particular order of words, noun-phrases, etc.) of the topics in the list. If so, the social networking service provider 125 may determine that the message relates to the content item and record the message's unique ID, content, and timestamp. In some examples, the social networking service provider 125 may parse the closed-caption text of the content item if it has not already been parsed. The social networking service provider 125 may determine the parsed message words or combinations of words (e.g., a co-occurrence of words, a particular order of words, noun-phrases, etc.) and determine whether they match any words or combination of words (e.g., a co-occurrence of words, a particular order of words, noun-phrases, etc.) of the parsed, closed-caption text of the content item. If so, the social networking service provider 125 may determine that the message relates to the content item and record the message's unique ID, content, and timestamp. Otherwise, if the message's topic (or text) does not match the topic (or text) relating to the content item, the social networking service provider 125 may determine that the social media message does not relate to the content item and might not record such information.

As discussed above, prior to the content item being transmitted in the linear stream, instructions to monitor for messages relating to the content item may be provided to the social networking service provider 125 by the point-of-interest controller 122. In some instances, the instructions may also indicate to periodically send a report regarding the messages relating to the content item that were posted during the transmission of the content item in the linear stream. In some examples, the instructions may specify to send the report periodically once the linear stream has begun broadcasting the content item in the linear stream. In such examples, the instructions may include either a program ID of the content item and a program schedule for the linear stream or a start time of when the transmission of the content item will begin. In other examples, the instructions may specify to monitor the messages relating to the content item and store monitored data for transmission in a report to the point-of-interest controller 122.

The time period associated with periodic transmission of the report may be a time period specified by the instructions or a time period specified by the request. In some instances, the instructions or the request may specify the start time and end time of each time period. Since the social networking service provider 125 begins monitoring at the start of transmission of the content item, the time period may have a start time prior to the current time. In some instances, the instruction or request may specify that the time period begin at the transmission of the last report. In some examples, the time period may be the last 5 seconds, last 10 seconds, last minute, or any other duration. The social networking service provider 125 may identify the messages relating to the content item and have a corresponding timestamp within the particular time period, which may then be used to generate the report. The report may include how many (e.g., the total number of) messages relating to the content item have been posted to the social networking service provider 125 during the particular time period. The report may also include a copy of one or more of the messages, an indication of which content item they relate, and their corresponding timestamps. Further, the report may include a report ID for use in tracking the reports, an indication of the time period and/or the content item identifier. Additionally or alternatively, the report may include, for each identified message, an indication of the reason the social networking service provider 125 identified the message as being related to the content item. As an example, the report may indicate that a message was identified by the social networking service provider 125 because it was associated with a social-network-specific identifier (e.g., a hashtag) related to the content item. As another example, the report may indicate that a different message was identified by the social networking service provider 125 because it included a topic or phrase derived from the closed-caption data of the content item, and may identify the topic or phrase. In some embodiments, each report may be specific to a content item and/or time period.

In step 315, the point-of-interest controller 122 may determine, in near real-time, whether a surge or spike in user reactions to the content item is occurring while the content item is being in the linear stream for view by the users.

In some instances, a surge or spike may be determined by aggregating how many messages relating to the content item were posted during the time period received from one or more (e.g., all) of the social networking service providers 125 and compare the aggregated number of messages with a minimum threshold amount of messages. In determining the aggregated total number of messages relating to the content item posted during a time period, the point-of-interest controller 122 may account for the different time zones. Messages received from users on the east coast will have a different timestamp than the messages received from users on the west coast even though the messages may been received during the same time period. As an example, a received message with a timestamp of 9:00 pm Eastern Standard Time (EST) and a different received message with a timestamp of 6:00 pm Pacific Standard Time (PST) were received during the same time period. The point-of-interest controller 122 may align the messages to account for time zones. In the above example, the point-of-interest controller 122 may align the messages by identifying the messages as occurring during the same time period. As another example, the point-of-interest controller 122 may identify a particular time period on the east coast as beginning at 9:00 pm and 5 seconds EST and ending at 9:00 pm and 35 seconds EST. The point-of-interest controller 122 may determine that the same particular time period on the west coast begins 6:00 pm and 5 seconds PST and ends at 6:00 pm and 35 seconds PST. Thus, the point-of-interest controller 122 may determine that messages received during these times fall within the same time period for purposes of determining surges or spikes in messages relating to the content item.

In one or more arrangements, the point-of-interest controller 122 may determine if messages from the different time zones (e.g., east coast and west coast) should even be related. The point-of-interest controller 122 may determine that messages received at different times are actually related and should be combined. For instance, a program shown on the East coast at 9:00 pm EST may be time delayed and displayed on the West coast at 9:00 pm PST. By combining guide information from the different areas and other identifying meta information associated with the messages, it may be determined that the messages received 3 hours later from the West coast should, in fact, be combined with the messages received from the East coast 3 hours earlier. As an example, a surge of 1000 messages with the hash tag #SecretAgent on the West coast for a time delayed program at 9:15 pm PST can get combined with a surge of 1000 messages with the hash tag #SecretAgent on the East coast at 9:15 pm EST despite the UTC times actually being 3 hours apart. In the end, there would be a bound 2000 messages to the 15 minute mark of the program that started at 9:00 pm relative to both time zones. In addition, a user may pre-record a program. By combining the temporal position relative to the playback of the content item at a viewing device with the time that they are expressing messages, the point-of-interest controller 122 may also determine the proper point in playback of the content at which the messages should be bound.

As indicated above, the point-of-interest controller 122 may aggregate how many messages were posted at multiple social networking service providers 125. As an example, the point-of-interest controller 122 may, in one report, receive an indication of how many messages relating to the content item were posted to a first social networking service provider during the time period and, in another report, receive an indication of how many messages relating to the content item posted to a second social networking service provider during the same time period. For instance, the point-of-interest controller 122 may receive an indication that 10,500 social messages related to the content item were received by the first social networking service provider during the last 30 seconds, and an indication that 34,000 messages related to the content item were received by the second social networking service provider during the last 30 seconds. Additionally, in one or more arrangements, the point-of-interest controller 122 may provide viewers with the ability to submit messages relating to the content item directly to the point-of-interest controller 122 via television remote control devices, smartphones, tablets, etc. Such messages may include an identifier of the content item. The point-of-interest controller 122 may determine that 40,100 messages were received by the point-of-interest controller 122 via the users' remote control devices (e.g., television remotes, smartphones, tablets, etc.) during the last 30 seconds. The point-of-interest controller 122 aggregate, for a particular time period, each of the received and/or determined number of messages relating to the content item. Following the above example, the point-of-interest controller 122 may add 10,500, 34,000 and 40,100 to determine that the aggregate total number of messages related to the content item during the last 30 seconds is 84,600.

As mentioned above, a surge or spike may be determined by aggregating the number of user reactions received from the variety of sources (e.g., social networks, remote control devices, etc.) and comparing the aggregated number of user reactions with a minimum threshold amount of messages relating to the content item. The particular threshold may be preset by an operator of the point-of-interest controller 122 or, alternatively, may be dynamically determined by the point-of-interest controller 122 based on a variety of factors.

One factor may be based on increases in the number of messages relating to the content item over multiple time periods. In one or more arrangements, the point-of-interest controller 122 may set the minimum threshold amount of messages relating to the content item based on how many messages relating to the content item have been received during a time period immediately preceding the current time period (e.g., the time period under analysis). For instance, the minimum threshold amount of messages relating to the content item may be a particular percentage (or amount) greater than the amount of messages relating to the content item that have been received during the time period immediately preceding the current time period, which may be reflective of a dramatic increase in messages relating to the content item being posted. As an example, the preset percentage 150% of the number of messages relating to the content item posted during the previous time period. If the number of messages relating to the content item posted during the previous time period is 10,000 messages, then the minimum threshold amount of messages relating to the content item may be 15,000 messages.

Another factor may be based on the content item itself, the topic of the content item, the type of the content item, a theme (e.g., genre) of the content item. The point-of-interest controller 122 may use one or more of the content item, its topic, type, and/or theme to determine the threshold itself or a weighting for use in calculating the threshold. As an example, the threshold may be specific to the content item. For instance, different content items may be associated with different thresholds and the point-of-interest controller 122 may use a content item identifier to select the threshold in a threshold database. A content item entitled "abc" may have a threshold of 50,000 messages and a different content item entitled "xyz" may have a threshold of 60,000 messages. In this manner, the point-of-interest controller 122 may account for a predicted popularity of the content item (e.g., based on the historical popularity of the content item) since a content item with a larger viewing audience would likely receive a greater number of messages. As another example, the content item's genre (e.g., horror, comedy, or the like) may be associated with a weighting used in determining the threshold (e.g., a horror genre may be associated with a weighting of 0.5 and a comedy genre may be associated with a 2.0 weighting). As yet another example, the content items genre or topic may be used to identify the threshold (e.g., a horror genre may be associated with a 50,000 minimum number of messages threshold and a comedy genre may be associated with a 70,000 minimum number of messages threshold). The type of the content item may include news program, live music event, live sport event, prerecorded program, movie, etc.

Another factor may include a subscription level of the viewing audience. For instance, the point-of-interest controller 122 may use the subscription level of the viewing audience to determine a weighting for use in calculating the threshold or identify the threshold itself. As an example, a content item being transmitted on a subscription-based channel may be associated with a particular weighting or be used to identify a threshold for the number of messages associated the content item on the subscription-based channel.

Using the one or more factors the point-of-interest controller 122 may determine the minimum threshold amount of messages relating to the content posted during the time period. If the point-of-interest controller 122 determines that the aggregated total amount of messages relating to the content item posted during the time period is less than the minimum threshold amount of messages, the point-of-interest controller 122 may determine that there has not been a surge in user reactions and process may return to step 310, where messages relating to the content item may continue to be monitored for the next time period.

Otherwise, if the point-of-interest controller 122 determines that the aggregated total amount of messages related to the content item posted during the time period is greater than or equal to the minimum threshold amount of messages, the point-of-interest controller 122 may determine that there has been a surge in user reactions to the content item and may proceed to step 320. A surge may reflect a point of interest in the content item.

At step 320, the point-of-interest controller 122 may identify a point in (or segment of) the content item corresponding with the surge in user reactions and identify this point in the content item as a hotspot of user interest. As used herein, this point in the content item may be also referred to as a hotspot or a point of interest.

In one or more arrangements, the point-of-interest controller 122 may identify the hotspot using the time period corresponding with the surge in user reaction. For instance, the start time of the time period may correspond to a time at which the hotspot occurred. As a result, the point-of-interest controller 122 may use a content item transmission schedule of when the content is scheduled to be transmitted in the linear stream and the start time of the time period to identify the start time of the hotspot. For instance, if the transmission of the content item in the linear stream and/or playback of the content item occurred at 7:00 pm and the start time of the time period occurred at 7:05 pm, then the point-of-interest controller 122 may determine that the start time of the hotspot is 5 minutes into playback of the content item (assuming there are no commercials). If there were one or more commercials interspersed into playback of the content item during the first 5 minutes, the point-of-interest controller 122 may account for the duration of these commercials when determining the start time of the hotspot, as will be discussed in further detail below.

In one or more additional or alternative arrangements, the point-of-interest controller 122 may use the timestamps of the messages to determine a start time of the hotspot. For instance, the point-of-interest controller 122 determine an average time for the timestamps. Additionally, the point-of-interest controller 122 may account for a delay in user's entering and submitting their messages relating to the content item to the social networking service providers 125. The delay may be any amount of time correlating to an amount of time a user would take in entering the user's message to a social networking service provider after viewing a point of interest in the content item. For example, the delay may be 10 seconds, 30 seconds, 1 minute, 2 minutes, or the like. The delay may be specified by an operator of the point-of-interest controller 122. As an example, the point-of-interest controller 122 may determine that the average time at which the surge in the users' reactions to the content item began is 9:35 and 30 seconds pm EST and may determine that the specified delay is one minute. In such an example, the point-of-interest controller 122 may determine that the time at which hotspot occurred is 9:34 and 30 seconds pm EST. The point-of-interest controller 122 may then use this time to look up the corresponding time in the content item in the content item transmission schedule to determine the start time of the hotspot relative to playback of the content item.

As an example, the content item transmission schedule may indicate that the content item began being transmitted at 9:30 pm EST. Following the above example, the point-of-interest controller 122 may determine that the hotspot occurred at 9:34 and 30 seconds pm EST. Using this information, the point-of-interest controller 122 may determine that the start time of the hotspot is 4 minutes and 30 seconds into playback of the content item (if there were no commercials interspersed within the first 4 minutes and 30 seconds of playback of the content item). However, if the point-of-interest controller 122 determines that there were one or more commercials interspersed between 9:30 pm EST and 9:34 and 30 seconds pm EST, then the point-of-interest controller 122 may account for the commercials by moving the start time forward by an amount equal to the duration of the one or more commercials. Following the above example, the point-of-interest controller 122 may determine that one commercial of 30 seconds occurred between 9:30 pm EST and 9:34 and 30 seconds pm EST and, as a result, the start time of the segment/hotspot is 4 minutes into playback of the content item.

In some embodiments, the content item may be transmitted to the viewers as a non-linear program (e.g., a video-on-demand (VOD) program, a web-based video program provided by a mobile application, a user-specified recorded video program, etc.). In such embodiments, the point-of-interest controller 122 may use the time at which the content item began being transmitted to the viewers and the time at which the surge in user reactions occurred to identify the start time of the hotspot. As an example, if the time at which the content item began being transmitted to the viewers is 10:30 am and the time at which the surge in user reactions occurred is 10:45 am (e.g., the start time of the time period), then the point-of-interest controller 122 may identify that the segment/hotspot began 15 minutes into playback of the content item. If any commercials were interspersed into the between 10:30 am and 10:45 am, the point-of-interest controller 122 may account for the commercials in a similar manner as discussed above. In some cases, rather than basing the determination of a hotspot's start time on the time at which a VOD program began being transmitted, the point-of-interest controller 122 may inspect metadata associated with transmission of the VOD program to identify a time relative to playback of the content item that the surge began and identify that time as the start time of the hotspot. In such cases, any trick plays performed by the user would be accounted for. For instance, if the user pauses the VOD program, the time relative to playback of the VOD program would also pause. In some embodiments, a user may specify to record a video program for later view, which may be stored in the user's local DVR and/or a remotely-located cloud DVR. As a result, the user may view the recorded video program subsequent to its scheduled transmission from a local office. The user's DVR may provide the point-of-interest controller 122 with metadata including various timing aspects associated with playback of the video program including, for example, a start time, an end time, times at which trick play requests (e.g., pause, unpause) were performed, and timing information for any messages the DVR receives from the viewer. The point-of-interest controller 122 may use the timing information associated with the recorded video program to determine surges in interest in the video program.

Additionally or alternatively, the point-of-interest controller 122 may identify the start time of the hotspot based on the content of the messages. For instance, some user reactions may quote the dialogue in the content item. The point-of-interest controller 122 may compare the quoted dialogue with closed captioning data of the content item to identify the start time of the hotspot. As an example, the message may include the quote "good luck." The point-of-interest controller 122 may filter the closed caption text using the time period and compare the filtered closed caption text with the quote "good luck." If there is a match, a time that is a preset timeframe prior to the time at which the dialogue is output may be the start time of the hotspot. The timeframe may be 0 seconds, 5 seconds, 10 seconds, 1 minute, etc.

In some embodiments, the point-of-interest controller 122 might not determine an end time of the hotspot relative to playback of the content item. That is, the point-of-interest controller 122 may only determine the start time of the hotspot relative to playback of the content item. The point-of-interest controller 122 may create a bookmark at the start time of each hotspot so that during subsequent playback of the content item a viewer may select various bookmarks to begin playback of the hotspot. The content item may continue to play through the hotspot and the rest of the content item until another input from the user is received (e.g., a selection of another bookmark, fast-forward, rewind, pause, stop, etc.), as will be discussed in further detail below.

In other embodiments, the point-of-interest controller 122 may determine an end time of the hotspot relative to playback of the content item, which it may determine in a variety of ways. In some instances, the point-of-interest controller 122 may continue to receive reports periodically from the social networking service providers 125. The point-of-interest controller 122 may aggregate the number of messages relating to the content item posted during a particular time period to one or more of the social networking service providers 125. The point-of-interest controller 122 may compare the aggregated number with the minimum threshold amount of messages relating to the content item. If the aggregated number is still above the minimum threshold amount, the point-of-interest controller 122 may determine that the hotspot has not yet ended and may identify the end time of the particular time period as still part of the hotspot. If the aggregated number is less than the minimum threshold amount, the point-of-interest controller 122 may determine that the hotspot has ended. In such instances, the point-of-interest controller 122 may identify the start time (or, alternatively, the end time) of the particular time period as corresponding to the end time of the hotspot. The point-of-interest controller 122 may then identify the end time of the hotspot relative to playback of the content item using content item transmission schedule. In a similar as discussed above with respect to the start time of the hotspot, the point-of-interest controller 122 may account for commercials when determining the end time of the hotspot.

Additionally or alternatively, the point-of-interest controller 122 may identify the start time and/or end time of the hotspot by identifying a scene displayed to the viewers during the time period and identifying the start time of the scene as the start time of the hotspot and the end time of the scene as the end time of the hotspot. If multiple scenes occurred during the time period, the start time of the first scene may be used as the start time of the hotspot. In some cases, the hotspot may be some default length (e.g., 10 seconds, 1 minute, etc.).

At step 325, the point-of-interest controller 122 may determine one or more attributes of the hotspot and store information relating to the hotspot in a library of hotspots (e.g., a hotspot database) in communication with the point-of-interest controller 122. The attributes may be a description of the characteristics of one or more scenes that occurred during the hotspot. For instance, an attribute may be a fight scene, a dance scene, a prayer scene, an action scene, a crying scene, a romantic scene, etc. The point-of-interest controller 122 may determine the attributes of the hotspot by analyzing the scenes of the content item occurring between the start time and end time of the hotspot. In some instances, the analysis may be performed via an algorithm or an operator viewing the one or more scenes of the hotspot. Additionally, the point-of-interest controller 122 may store other information relating to the hotspot such as the group ID (e.g., television series), content item ID, the start time of the hotspot, the end time of the hotspot, and the like.

At step 330, the point-of-interest controller 122 may determine if the linear transmission of the content item has ended. If so, the process may end. Otherwise, if the linear transmission of the content item has not ended, the process may return to step 310 where the point-of-interest controller 122 and the social networking service providers 125 may continue to monitor user reactions to the content item for the next time period.

Figure 4:
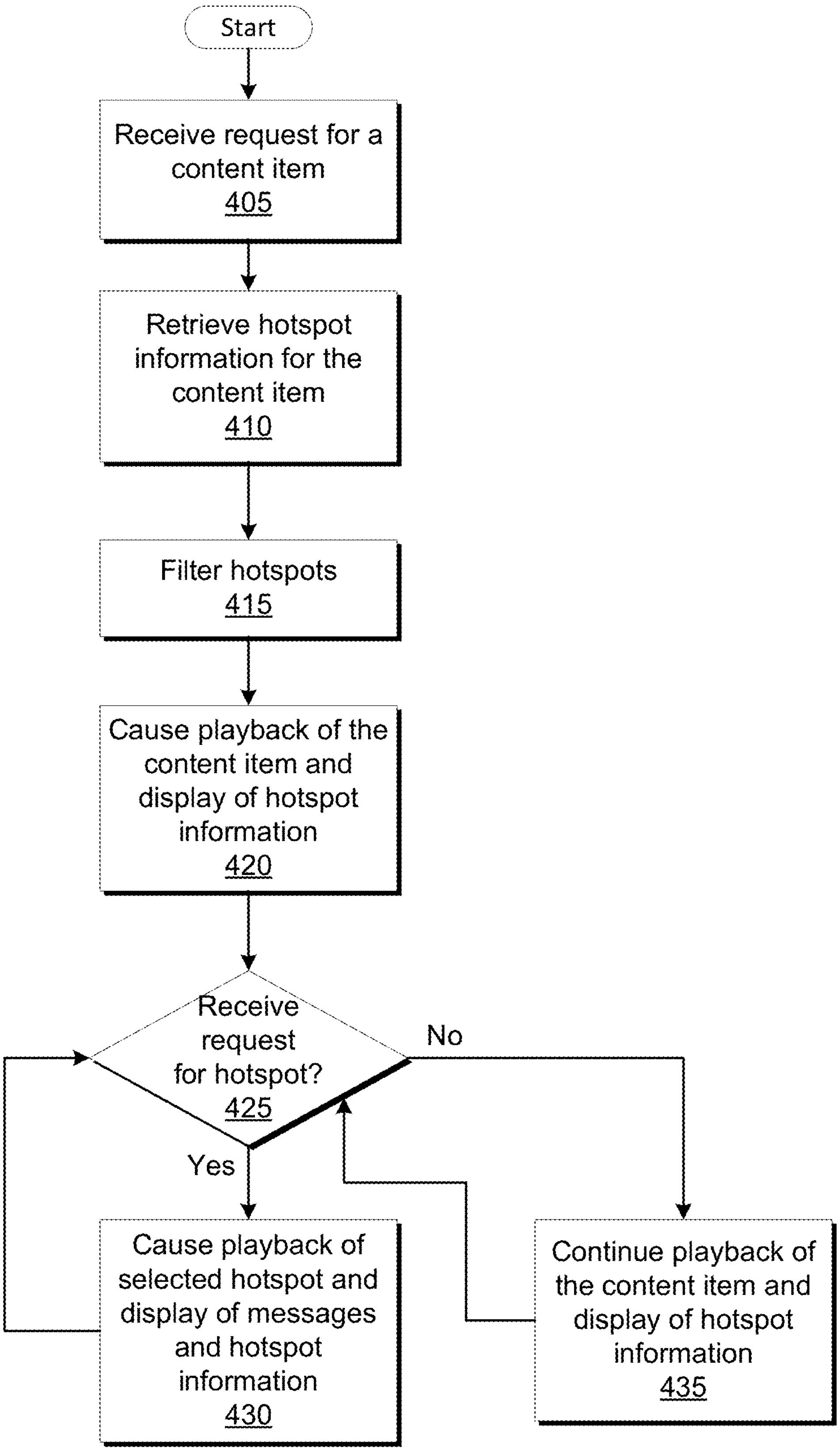
FIG. 4 depicts an example flow chart for utilizing hotspots during playback of a content item, in accordance with one or more aspects as described herein.

FIG. 4 depicts an example flow chart for utilizing hotspots during playback of a content item in accordance with one or more aspects as described herein. The method of FIG. 4 and/or one or more steps thereof may be performed by a computing device (e.g., the point-of-interest controller 122). The method illustrated in FIG. 4 and/or one or more steps thereof may be partially or fully embodied, for example, in computer-executable instructions that are stored in a computer-readable medium, such as a non-transitory computer-readable memory. In some instances, one or more of the steps of FIG. 4 may be performed in a different order and/or combined. In some instances, one or more of the steps of FIG. 4 may be omitted and/or otherwise not performed.

The method of FIG. 4 may enable users to select various hotspots associated with a content item during playback of the content item. For instance, while the viewer is being presented the content item, a menu may be overlaid on the picture and/or a displayed as a picture-in-picture window. The menu may include a playback timeline of the content item with a bookmark at the start time of each of the hotspots, which may have determined in the manner discussed above in FIG. 3. The playback timeline may be a linear progress bar of playback of the content item.

As seen in FIG. 4, at step 405, a computing device (e.g., the point-of-interest controller 122) may receive a request for a content item from one or more client/user/requesting devices (e.g., the STB/DVR 113, the personal computer 114, the laptop computer 115, the wireless devices 116, or another computing device). The request may include a channel ID, a current time, a content ID, a VOD ID, and the like. Using this information, the point-of-interest controller 122 may identify the content item.

At step 410, the point-of-interest controller 122 may retrieve hotspot information for the content item from the hotspot database. For instance, the point-of-interest controller 122 may retrieve, for each hotspot for the content item, its bookmark information (e.g., its start time and end time relative to playback of the content item), its attribute information (e.g., an indication whether its fight scene, dance scene, etc.), one or more messages corresponding to the hotspot, information about the content retrieved from local or third party sources (e.g., critic reviews, viewer reviews, plot summary, rating (e.g., PG, PG-13, R, or the like), listing of actors/singers, review ratings (e.g., 4 out of 5 stars), etc.).

At step 415, the point-of-interest controller 122 may filter out one or more hotspots for the content item. In some instances, the filter may be based on specified attributes set in the request received in step 405. As an example, the request may specify to only show hotspots associated with fight scenes and, as a result, hotspots having attributes indicating they are a dance scene may be filtered out. In some cases, these specified attributes for filtering may be user selected via an interactive interface with a list of selectable attributes of the hotspots. In other cases, these specified attributes may be automatically selected on behalf of the viewer as determined by the user presence and user preferences (e.g., the user may select attributes via a preference interface). For example, the point-of-interest controller 122 may, for one viewer having set preferences, automatically filter to include only those hotspots having attributes about clothing and may, for another viewer with no set preferences, enable selection of filters to include only those hotspots having the attribute of dancing.

Figure 5:
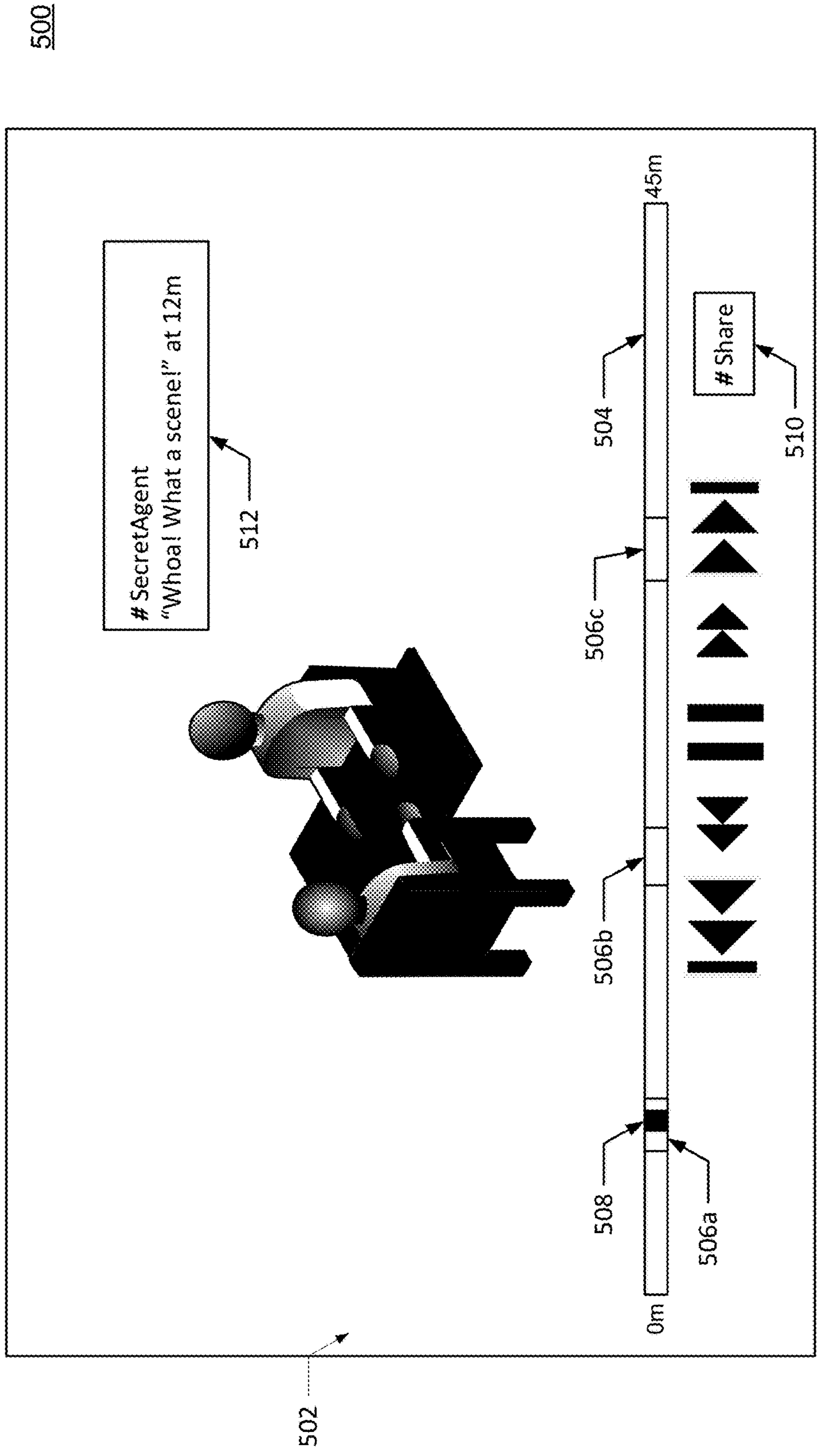
FIG. 5 depicts an example user interface for playback of a content item, in accordance with one or more aspects as described herein.

At step 420, the point-of-interest controller 122 may cause playback of the content item and cause display of hotspot information (e.g., bookmarks) that were not filtered out in step 415. For instance, the point-of-interest controller 122 may transmit the content item in linear stream to the requesting device of step 405 for playback to the user. During playback (e.g., display) of the content item at the requesting device, a menu may also be displayed overlaid on the content item or as a separate window on the display. The menu may include a playback timeline of the content item and may identify one or more bookmarks. FIG. 5 depicts an example user interface 500 displaying the content item and the menu. As shown in FIG. 5, the user interface 500 may include an area 502 for playback of the content item. The user interface 500 may include a playback timeline 504 including one or more hotspots 506*a-c* (506 generally). The playback timeline 504 may be a linear progress bar for playback of the content item beginning at time 0 (e.g., 0 minutes) and ending at the end time of the content item (e.g., 45 minutes), which may be equal to the duration of the content item. The playback timeline 504 may also include an indication 508 of where in the playback timeline 504 is currently being played back to the user. The user interface 500 may also include other trick-play features such as pause, fast-forward, rewind, skip to next/previous chapter/scene, etc. An additional menu feature may be a share icon 510 that allows the user to enter their user reactions and post messages to the social networking service providers 125, which may be used to update the hotspots and/or be one of the messages displayed during presentation of the hotspot as will be described in further detail below. Further, the menu may permit users to annotate a hotspot or add it to a favorite's list of hotspots for that viewer (e.g., via selection of a favorites icon), which may be shared with family and friends.

In some instances, the playback timeline 504 and other menu features might not be persistently displayed during playback of the content item, rather they may be displayed in response to a user action (e.g., selection of a button on a remote, touching the screen on a tablet, etc.). If no user selection is made, the playback timeline 504 and other menu features may disappear so that only the content item is viewable (until another user action is received).

At step 425, the point-of-interest controller 122 may determine whether it has received a request for a particular hotspot of the content item. While viewing playback of the content item, the user may select any hotspot 506 in the playback timeline 504. In one example, if the user selects the hotspot 506*a* (e.g., either by selecting a button on a remote control device, touching the hotspot 506*a* on a touchscreen, etc.) the user's device may send a hotspot identifier upstream to the point-of-interest controller 122.

At step 430, in response to receiving a selection of a hotspot (e.g., the hotspot 506*a*), the point-of-interest controller 122 may cause playback of the selected hotspot and cause display of the hotspot information (e.g., menu, attribute information, other data relating to the hotspot). As a result, regardless of what point is currently being played back (e.g., the beginning, an intermediate point, etc.), playback may jump (forwards or backwards) to the start time of the selected hotspot. During playback of the hotspot, the point-of-interest controller 122 may cause display of one or more messages associated with the hotspot. The messages may have been the created by users of the social networking service providers 125 and received in the reports from the social networking service providers 125. The messages may be overlaid on top of the displayed content item. As shown in FIG. 5, the message 512 is displayed and includes a topic identifier (e.g., #SecretAgent), which may be the name of the content item in some cases, the content of the message (e.g., "Whoa! What a scene!) and a timestamp relative to playback of the content item in which message was received (e.g., at 12 minutes). In one or more arrangements, a message may be presented for a preset time period (e.g., 10 seconds, 30 seconds, etc.) at which point it may be removed and, optionally another message may be displayed, and so on. The point-of-interest controller 122 may select the messages and their order of display based on a variety of factors such as popularity (e.g., messages with highest number of re-posts, replies, comments, likes, favorites, etc.), appropriateness of the content (e.g., text) of the messages (e.g., messages with profanity might not be displayed), and the like. The popularity of the message may be determined by either the social networking service providers 125 (and included in their reports) or by the point-of-interest controller 122. The process may then return to step 425.

At step 435, in response to not receiving a selection of a hotspot, the point-of-interest controller 122 may continue to permit playback of the current portion of the content item and display hotspot information. Following the above example, after the user selected the hotspot 506*a* and the playback of the hotspot 506*a* began, the user might not select another hotspot. As a result, playback of the content item may continue from the start of the hotspot until the end of the content item. In such an instance, after playback of the end of the hotspot, a next sequential portion of the content item will begin playback. The process may then return to step 425. Steps 425-435 enable the user to select hotspot to jump (forwards or backwards) to various hotspots and enable playback of the content item either until another selection is made or until the end of the content item is reached.

In some embodiments, the point-of-interest controller 122 may be responsible for tracking actions of users relating to playback of the content item and for adjusting the start time of the hotspot (e.g., point of interest, segment, etc.) based on these actions. The point-of-interest controller 122 may log actions of the users and a timestamp of when each action occurred. The point-of-interest controller 122 may determine whether, soon after selecting a hotspot (e.g., within a preset time period such as 5 or 15 seconds), the user fast-forward or rewound the content item, which may reflective of when the scene associated with the hotspot began (e.g., when the fight in the fight scene started). In one instance, if most (e.g., at least some preset number or percentage of) viewers rewind the content item soon after selecting a particular hotspot, the point-of-interest controller 122 may determine that the start time of the hotspot should actually occur earlier with respect to playback of the content item. The point-of-interest controller 122 may record the time relative to playback of the content item to which each user rewound and use the average of these times as the new start time of the hotspot. As an example, the start time of the hotspot may be at time 12 minutes into playback of the content item. The point-of-interest controller 122 may determine that viewers on average rewind the content item after selecting this hotspot to begin playback of the content item at 11 minutes and 45 seconds into playback of the content item. Accordingly, the point-of-interest controller 122 may adjust the start time of the hotspot to 11 minutes and 45 seconds into playback of the content item. In another instance, if most (e.g., at least some preset number or percentage of) viewers fast-forward the content item soon after selecting a particular hotspot, the point-of-interest controller 122 determine that the start time of the hotspot should actually occur later with respect to playback of the content item. The point-of-interest controller 122 may record the time relative to playback of the content item to which each user fast-forwarded and use the average of these times as the new start time of the hotspot. As an example, the start time of the hotspot may be at time 12 minutes into playback of the content item. The point-of-interest controller 122 may determine that viewers on average fast-forward the content item, after selecting this hotspot to begin playback of the content item, to 12 minutes and 30 seconds into playback of the content item. Accordingly, the point-of-interest controller 122 may adjust the start time of the hotspot to 12 minutes and 30 seconds into playback of the content item.

In some embodiments, the point-of-interest controller 122 may be responsible for tracking actions of users relating to playback of the content item and for adjusting the end time of the hotspot (e.g., point of interest, segment, etc.) based on these actions. The point-of-interest controller 122 may log actions of the users and a timestamp of when each action occurred. The point-of-interest controller 122 may determine whether a user has a pattern of selecting another hotspot soon after viewing the end of the current hotspot. For instance, the point-of-interest controller 122 may compare the end time of the hotspot with the time relative to playback of the content item that the user selected the next hotspot. If the selection of the next hotspot is soon after (e.g., within a preset time period such as 5 seconds or 10 seconds of) the end time of the hotspot and this selection of a next hotspot trend continues to occur for a preset number (e.g., at least two) iterations, the point-of-interest controller 122 may determine that the user currently has a pattern of selecting another hotspot soon after viewing the end of the current hotspot. In such cases, if at least a preset number of users having this pattern select a next hotspot prior to the end time of the current hotspot, the point-of-interest controller 122 may set the end time of the current hotspot as the average time the user selected the next hotspot relative to playback of the content item. As a result, the end time of the hotspot may be moved to an earlier time. If at least a preset number of users having this pattern select a next hotspot at least a preset duration after the end time of the current hotspot, the point-of-interest controller 122 may set the end time of the current hotspot as the average time the user selected the next hotspot relative to playback of the content item. As a result, the end time of the hotspot may be moved to a later time.

Figure 6:
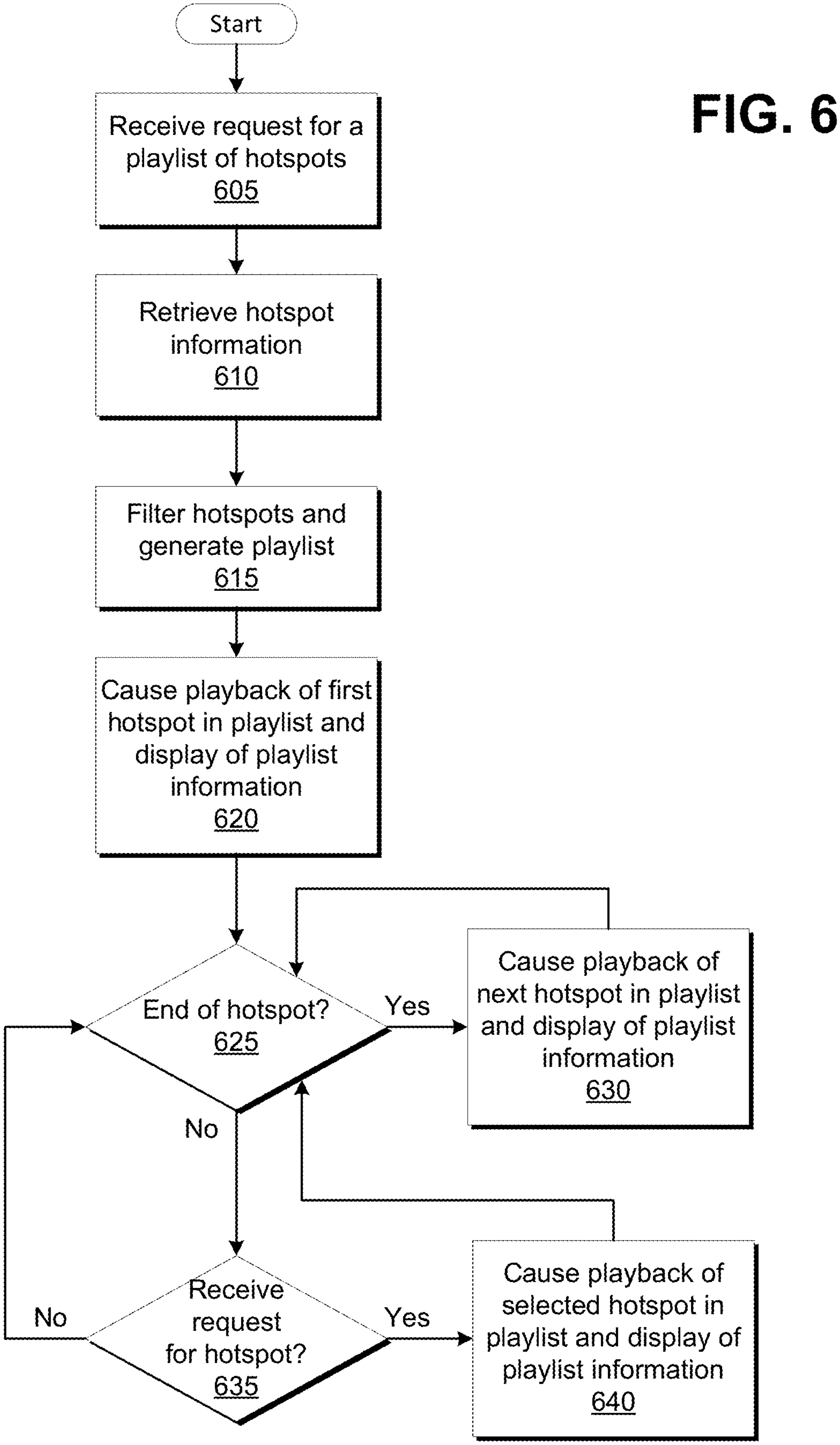
FIG. 6 depicts an example flow chart for utilizing hotspots during playback of a content item, in accordance with one or more aspects as described herein.

FIG. 6 depicts an example flow chart for utilizing hotspots during playback of a content item in accordance with one or more aspects as described herein. The method of FIG. 6 and/or one or more steps thereof may be performed by a computing device (e.g., the point-of-interest controller 122). The method illustrated in FIG. 6 and/or one or more steps thereof may be partially or fully embodied, for example, in computer-executable instructions that are stored in a computer-readable medium, such as a non-transitory computer-readable memory. In some instances, one or more of the steps of FIG. 6 may be performed in a different order and/or combined. In some instances, one or more of the steps of FIG. 6 may be omitted and/or otherwise not performed.

The method of FIG. 6 may be performed to enable users to view a dynamic playlist (e.g., a highlight reel) of various hotspots associated with one or more content items. For example, a viewer may wish to view scenes hotspots for a particular reality television series or particular television show within the television series. In some cases, the user may also wish to view only the hotspots having a particular attribute (e.g., fight scenes, dance scenes, etc.). The user may send a request for the playlist and, in response, may receive the playlist having hotspots with such attributes for view. As a result, the viewer may quickly and efficiently view each scene having the requested attribute. The hotspots may have been determined in the manner discussed above in FIG. 3. In some instances, the methods of FIGS. 4 and 6 may be combined.

As seen in FIG. 6, at step 605, a computing device (e.g., the point-of-interest controller 122) may receive a request for a playlist of hotspots. In some examples, the point-of-interest controller 122 may provide an interactive program guide to client devices (e.g., the STB/DVR 113, the personal computer 114, the laptop computer 115, the wireless devices 116, or another computing device). The guide may include selectable icons to view hotspots of a television show, a television series, movie, or other content item. Upon selection of such an icon, a request may be sent from the client device to the point-of-interest controller 122. The request may include an icon ID that may be associated with a television show, a television series, movie, or other content item. In some examples, the request may include one or more attributes with which each hotspot in the playlist should contain.

At step 610, the point-of-interest controller 122 may retrieve hotspot information from the hotspot database. In some examples, the point-of-interest controller 122 may obtain the hotspots for a televisions series, a television show, a series of movies, and/or a movie.

At step 615, the point-of-interest controller 122 may filter the retrieved hotspots and generate a playlist of hotspots. If one or more attributes were received in the request, the point-of-interest controller 122 may remove hotspots that do not have the requested attributes. Additional, filters may include showing only those hotspots associated with the user's friends list, top 10 hotspots, etc. Using the remaining hotspots (e.g., the unfiltered hotspots), the point-of-interest controller 122 may generate a playlist of hotspots. In some instances, the hotspots in the playlist may be in chronological order. In other instances, the hotspots in the playlist may be in non-chronological order. For example, the hotspots may be ordered based on their popularity as discussed above. The order of the tiles (discussed below) may represent the order of the hotspots.

Figure 7:
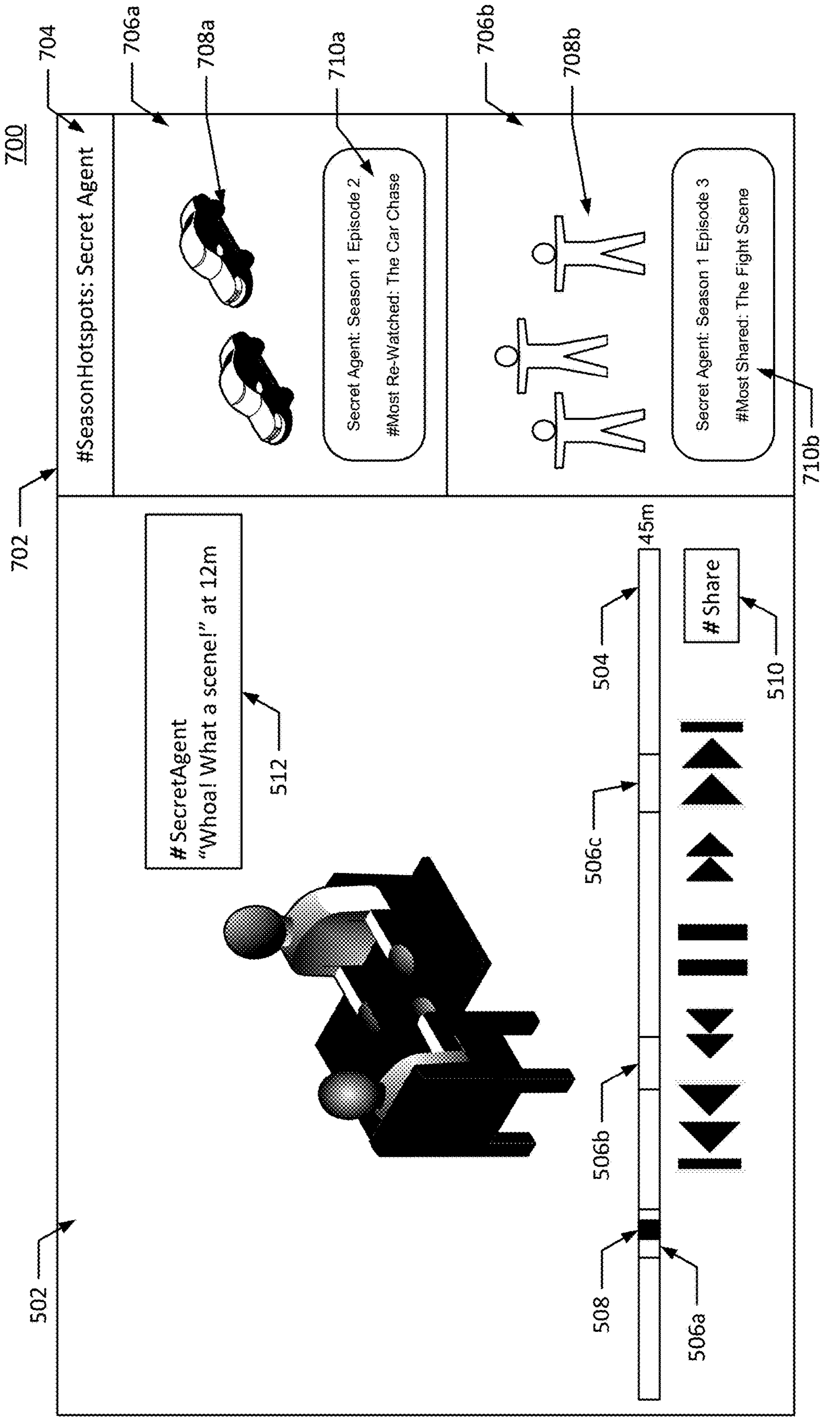
FIG. 7 depicts a user interface for playback of a playlist, in accordance with one or more aspects described herein.

At step 620, the point-of-interest controller 122 may transmit the playlist to the requesting devices, cause playback of the first hotspot in the playlist at the requesting devices, and cause display of playlist information at the requesting devices. FIG. 7 depicts a user interface 700 that includes a user interface 500 and a playlist 702. The playlist 702 includes a playlist header (e.g., title) 704 and one or more tiles 706 (e.g., thumbnails) representing different hotspots in the playlist. The playlist 702 may be scrollable so that a user can view all tiles 706 and select a hotspot in the playlist by selecting a tile. In this example, tile 706*a* and tile 706*b* (generally 706) are currently shown. Each of the tiles 706 may include a representative image (e.g., picture) 708 of the scene. As an example, the tile 706*a* may include image 708*a*, which may be an image of a car chase scene taken from its hotspot. As another example, the tile 706*b* may include image 708*b*, which may be an image of a fight scene taken from its hotspot. The tiles 706 may also include an information region 710 that includes information about their corresponding hotspot. As an example, the tile 706*a* may include information region 710*a* that lists the title, season number and episode number of the content item associated with the hotspot. Further, the information region 710*a* may also include a characteristic, attribute or other information of the hotspot. In this instance, the car chase scene hotspot was the most re-watched hotspot. Similarly, the tile 706*b* may include information region 710*b* that lists the title, season number and episode number of the content item associated with the hotspot. Further, the information region 710*b* may also include a characteristic, attribute or other information of the hotspot. In this instance, the fight scene hotspot was the most shared hotspot. As noted above, the user interface 700 may also include user interface 500 discussed above in FIG. 5 so that the viewer may also view playback of the hotspot and may also include controls to play the content item associated with that hotspot. However, unlike above where after a hotspot ended, the rest of the content item would continue playback, here the next hotspot of the playlist may begin as discussed below in step 630. As shown in FIG. 5, when a hotspot is being displayed, the playback timeline 504 of the hotspot's associated content item may be displayed and used to view other parts of the content item. As an example, the user may select other hotspots of the content item but which might not be on the playlist of hotspots in a similar manner as discussed above in FIGS. 4 and 5. The user may perform other trick play operations such as rewind, fast-forward, pause, etc.

At step 625, the point-of-interest controller 122 may determine whether the current hotspot being played back to the viewer has ended. If so, then, at step 630, the point-of-interest controller 122 may cause playback of the next hotspot in the playlist (e.g., the tile 706*a*) based on its order in the playlist and display of playlist information. The process may then return to step 625.

If playback of the current hotspot has not ended, then, at step 635, the point-of-interest controller 122 may determine whether it has received a request for a different hotspot in the playlist. If so, then, at step 640, the point-of-interest controller 122 may cause playback of the selected hotspot in the playlist and display of playlist information. The process may then return to step 625. Using the steps of 635-640, the user may select any hotspot in the playlist for playback.

In some embodiments, the point-of-interest controller 122 may adjust the start time and/or end time of a hotspot (e.g., point of interest, segment, etc.) in the playlist in a similar manner as discussed above. The point-of-interest controller 122 may also account for selections of a next hotspot in the playlist in making such adjustments.

In some embodiments, parental control features may be implements for the playback of hotspots. For instance, the requests may include a viewer ID, which the point-of-interest controller 122 may use to determine if the viewer is permitted to view a hotspot based on the hotspot's rating. Any hotspots that the viewer is not permitted to view may be removed from the playlist 702. In some embodiments, subscriber-level control features may be implements for the playback of hotspots. For instance, the requests may include a viewer ID, which the point-of-interest controller 122 may use to determine if the viewer is permitted to view a hotspot based on the hotspot's subscriber-level. Any hotspots that the viewer is not permitted to view may be removed from the playlist 702. In some embodiments, advertisements may be embedded in the playlist between hotspots. In some embodiments, users can share their playlists (e.g., a favorites playlist, a requested playlist, user-custom-order playlist, etc.) with other individuals.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:

determining, by a computing device, a dynamic threshold based on a quantity of messages associated with a content item during a first time period;

based on a quantity, of a plurality of messages associated with the content item during a subsequent time period, satisfying the dynamic threshold, determining, by the computing device, a segment of the content item associated with a point of interest;

adjusting, based on user input, a start time of the segment; and causing, during playback of the content item, output of an indication of the segment associated with the point of interest, wherein the indication of the segment is overlaid on the content item.

2. The method of claim 1, wherein the determining the dynamic threshold further comprises increasing a minimum threshold quantity of messages based on a percentage of the quantity of messages associated with the content item during the first time period.

3. The method of claim 1, further comprising:

determining, based on a level of popularity, a message of the plurality of messages; and during playback of the segment, causing output of the message, of the plurality of messages, at a time of the segment corresponding to when the message was sent by a user.

4. The method of claim 1, wherein the determining the segment comprises:

determining one or more attributes of the point of interest; and storing, in a memory, the one or more attributes of the point of interest and one or more messages of the plurality of messages.

5. The method of claim 1, wherein the indication comprises a user-selectable icon, of a playback timeline associated with the content item, representing the point of interest.

6. The method of claim 1, wherein the adjusting the start time of the segment further comprises one of:

modifying the start time of the segment to be earlier in time; or modifying the start time of the segment to be later in time.

7. The method of claim 1, wherein the determining the segment comprises:

determining, based on comparing content of the plurality of messages with closed captioning data of the content item, the start time of the segment.

8. The method of claim 1, wherein the indication visually distinguishes a duration of the segment from a duration of the content item.

9. An apparatus comprising:

one or more processors; and memory storing computer executable instructions that, when executed by the one or more processors, cause the apparatus to:

determine a dynamic threshold based on a quantity of messages associated with a content item during a first time period;

based on a quantity, of a plurality of messages associated with the content item during a subsequent time period, satisfying the dynamic threshold, determine a segment of the content item associated with a point of interest;

adjust, based on user input, a start time of the segment; and cause, during playback of the content item, output of an indication of the segment associated with the point of interest, wherein the indication of the segment is overlaid on the content item.

10. The apparatus of claim 9, wherein the instructions, when executed by the one or more processors, further cause the apparatus to determine the dynamic threshold by causing:

increasing a minimum threshold quantity of messages based on a percentage of the quantity of messages associated with the content item during the first time period.

11. The apparatus of claim 9, wherein the instructions, when executed by the one or more processors, further cause the apparatus to:

determine, based on a level of popularity, a message of the plurality of messages; and during playback of the segment, cause output of the message, of the plurality of messages, at a time of the segment corresponding to when the message was sent by a user.

12. The apparatus of claim 9, wherein the indication comprises a user-selectable icon, of a playback timeline associated with the content item, representing the point of interest.

13. The apparatus of claim 9, wherein the instructions, when executed by the one or more processors, further cause the apparatus to:

adjust, based on a duration of an advertisement associated with the content item, the start time of the segment.

14. The apparatus of claim 9, wherein the instructions, when executed by the one or more processors, further cause the apparatus to adjust the start time of the segment by causing:

determining, for each of one or more users associated with the plurality of messages, a time to which the user at least rewound or fast-forwarded the segment; and setting the start time to an average of the determined times.

15. The apparatus of claim 9, wherein the instructions, when executed by the one or more processors, further cause the apparatus to determine the segment by causing:

determining, based on comparing content of the plurality of messages with closed captioning data of the content item, the start time of the segment.

16. One or more non-transitory computer readable media storing instructions that, when executed cause:

determining a dynamic threshold based on a quantity of messages associated with a content item during a first time period;

based on a quantity, of a plurality of messages associated with the content item during a subsequent time period, satisfying the dynamic threshold, determining a segment of the content item associated with a point of interest;

adjusting, based on user input, a start time of the segment; and causing, during playback of the content item, output of an indication of the segment associated with the point of interest, wherein the indication of the segment is overlaid on the content item.

17. The one or more non-transitory computer readable media of claim 16, wherein the instructions, when executed, further cause determining the dynamic threshold by causing increasing a minimum threshold quantity of messages based on a percentage of the quantity of messages associated with the content item during the first time period.

18. The one or more non-transitory computer readable media of claim 16, wherein the instructions, when executed, further cause determining the segment by causing:

determining one or more attributes of the point of interest; and storing, in a memory, the one or more attributes of the point of interest and one or more messages of the plurality of messages.

19. The one or more non-transitory computer readable media of claim 16, wherein the instructions, when executed, further cause adjusting the start time of the segment by causing:

determining, for each of one or more users associated with the plurality of messages, a time to which the user at least rewound or fast-forwarded the segment; and setting the start time to an average of the determined times.

20. The one or more non-transitory computer readable media of claim 16, wherein the instructions, when executed, further cause determining the segment by causing:

determining, based on comparing content of the plurality of messages with closed captioning data of the content item, the start time of the segment.

* * * * *